United States Patent
Kondoh

(10) Patent No.: US 9,286,008 B2
(45) Date of Patent: Mar. 15, 2016

(54) JOB MANAGEMENT APPARATUS CONNECTED TO AN EXTERNAL STORAGE VIA A NETWORK, INCLUDING A STORAGE MANAGEMENT UNIT THAT DETERMINES WHETHER TO STORE JOB DATA IN THE EXTERNAL STORAGE BASED ON PREDETERMINED TRANSFER CONDITION

(71) Applicant: Naritake Kondoh, Kanagawa (JP)

(72) Inventor: Naritake Kondoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 48 days.

(21) Appl. No.: 13/656,865

(22) Filed: Oct. 22, 2012

(65) Prior Publication Data

US 2013/0107309 A1    May 2, 2013

(30) Foreign Application Priority Data

Oct. 31, 2011    (JP) .................................. 2011-238580

(51) Int. Cl.
*G06K 15/00*    (2006.01)
*G06F 3/12*    (2006.01)

(52) U.S. Cl.
CPC .............. *G06F 3/1203* (2013.01); *G06F 3/122* (2013.01); *G06F 3/1274* (2013.01); *G06F 3/1288* (2013.01); *G06F 3/1273* (2013.01)

(58) Field of Classification Search
None
See application file for complete search history.

(56) References Cited

U.S. PATENT DOCUMENTS

| | | | | |
|---|---|---|---|---|
| 2003/0072025 A1* | 4/2003 | Simpson et al. | .............. | 358/1.15 |
| 2005/0134896 A1* | 6/2005 | Koga | ............................. | 358/1.14 |
| 2007/0229884 A1* | 10/2007 | Tanaka | ........................ | 358/1.15 |
| 2007/0234074 A1* | 10/2007 | Matsuzaki et al. | ............. | 713/193 |
| 2008/0068643 A1* | 3/2008 | Yasunaga | ...................... | 358/1.15 |
| 2009/0237702 A1* | 9/2009 | Yun | ............................... | 358/1.13 |
| 2010/0220355 A1* | 9/2010 | Sugiyama | .................... | 358/1.15 |
| 2011/0222116 A1* | 9/2011 | Tomita | ......................... | 358/1.15 |
| 2011/0314242 A1* | 12/2011 | Satoyama et al. | ............. | 711/162 |

FOREIGN PATENT DOCUMENTS

| | | |
|---|---|---|
| JP | 2006-042080 | 2/2006 |
| JP | 2008-035080 | 2/2008 |
| JP | 2008-217718 | 9/2008 |
| JP | 2008-250972 | 10/2008 |
| JP | 2010-020397 | 1/2010 |
| JP | 2011-010219 | 1/2011 |

OTHER PUBLICATIONS

Japanese Office Action dated Oct. 13, 2015.

* cited by examiner

*Primary Examiner* — Vincent Rudolph
*Assistant Examiner* — Richa Mishra
(74) *Attorney, Agent, or Firm* — IPUSA, PLLC

(57) ABSTRACT

A job management apparatus connected to an external storage via a network, includes a storage management unit that determines whether to store job data of a job to be executed by an electronic device in the external storage based on a predetermined transfer condition; and a job management unit that stores the job data in the external storage when the storage management unit determines to store the job data in the external storage.

15 Claims, 20 Drawing Sheets

| JOB ID | STORAGE USER ID | BIBLIOGRAPHY | STORAGE INFORMATION | | SIZE |
|---|---|---|---|---|---|
| J001 | UserA | (file name: minutes.doc, ..., the number of printings: 5, color setting: color, ....) | INTERNAL 01 | file:¥¥D¥Storage¥UserA¥Job_1 | 1024 |
| J002 | UserB | (file name: Memo.txt, ..., the number of printings: 1, color setting: monochrome, ....) | INTERNAL 01 | file:¥¥D¥Storage¥UserB¥Job_2 | 128 |
| J003 | UserB | (file name: presentation.ppt, ..., the number of printings: 3, color setting: color, ....) | INTERNAL 01 | file:¥¥D¥Storage¥UserB¥Job_3 | 64 |
| J004 | UserC | (file name: Doc.ppt, ..., the number of printings: 1, color setting: monochrome, ....) | INTERNAL 01 | file:¥¥D¥Storage¥UserC¥Job_4 | 300 |
| ⋮ | ⋮ | ⋮ | ⋮ | ⋮ | ⋮ |

FIG.5

| AREA KIND | STORAGE ID | METHOD OF ACCESSING | |
|---|---|---|---|
| INTERNAL | INTERNAL 01 | FileSystem | file:¥¥D¥Storage¥... |
| EXTERNAL | EXTERNAL 01 | SMB | ¥¥NAS¥Storage¥... |
| EXTERNAL | EXTERNAL 02 | HTTP | http://aaa.com/... |
| EXTERNAL | EXTERNAL 03 | HTTP | http://bbb.com/... |
| ... | ... | ... | ... |

| CONTROL PARAMETER | TRANSFER CONDITION | NEW STORAGE ID | PRIORITY |
|---|---|---|---|
| Job.Count | Job.Count ≧ 1000 | EXTERNAL 01 | 1 |
| Job.Size | Job.Size ≧ 10 MB | EXTERNAL 02 | 2 |
| Job.Size | | EXTERNAL 03 | 3 |
| Job.Size | | EXTERNAL 04 | 4 |
| ..... | ..... | ..... | ..... |

| CONTROL TIMING | CONTROL PARAMETER | TRANSFER CONDITION | NEW STORAGE ID | PRIORITY |
|---|---|---|---|---|
| WHEN JOB ACCEPTED | Job.Name | Job.Name INCLUDE "CONFIDENTIAL" | EXTERNAL 01 | 1 |
| WHEN JOB PROCESSED | Job.Size | Job.Size≧10 MB | EXTERNAL 02 | 2 |
| AFTER JOB PROCESSED | Job.Size | | EXTERNAL 03 | 3 |
| WHEN JOB ACCEPTED WHEN JOB EXECUTED | Print.Count | Print.Count≧100 | EXTERNAL 01 | 4 |
| ... | ... | | ... | ... |

| USER ID | LOG-IN AUTHENTICATION | ACCESSIBLE STORAGE ID | ACCESS AUTHENTICATION | |
|---|---|---|---|---|
| UserA | **** | EXTERNAL 01 | (UserA,XXX1) | ⋮ |
| | | EXTERNAL 03 | (UserA,XXX2) | ⋮ |
| UserB | **** | EXTERNAL 01 | (UserB,YYY1) | ⋮ |
| | | EXTERNAL 02 | (UserB,YYY2) | ⋮ |
| UserC | **** | EXTERNAL 01 | (UserC,ZZZZ) | ⋮ |
| | | EXTERNAL 04 | (UserC@aaa.com,AAAA) | ⋮ |
| ⋮ | ⋮ | ⋮ | ⋮ | ⋮ |

| USER ID | LOG-IN AUTHENTICATION | ACCESSIBLE STORAGE ID | ACCESS AUTHENTICATION | USE HISTORY | |
|---|---|---|---|---|---|
| | | | | | 50D |
| UserA | **** | EXTERNAL 01 | (UserA,XXX1) | 55 | ... |
| | | EXTERNAL 03 | (UserA,XXX2) | | ... |
| UserB | **** | EXTERNAL 01 | (UserB,YYY1) | 101 | ... |
| | | EXTERNAL 02 | (UserB,YYY2) | | ... |
| UserC | **** | EXTERNAL 01 | (UserC,ZZZZ) | 90 | ... |
| | | EXTERNAL 04 | (UserC@aaa.com,AAAA) | | |
| ... | ... | ... | ... | ... | |

FIG.19

| CONTROL PARAMETER | TRANSFER CONDITION | APPLIED USER ID | NEW STORAGE ID | PRIORITY |
|---|---|---|---|---|
| Job.Name | Job.Name INCLUDE "CONFIDENTIAL" | (UserA,UserB) | EXTERNAL 01 | 1 |
| Job.Size | Job.Size≧10 MB | (UserA,UserC) | EXTERNAL 03 | 2 |
| User.Print.Count | User.Print.Count≧100 | (UserB) | EXTERNAL 02 | 3 |
| Job.Size | Job.Size≧100 MB | (UserC) | EXTERNAL 04 | 4 |
| ... | ... | ... | ... | ... |

70D

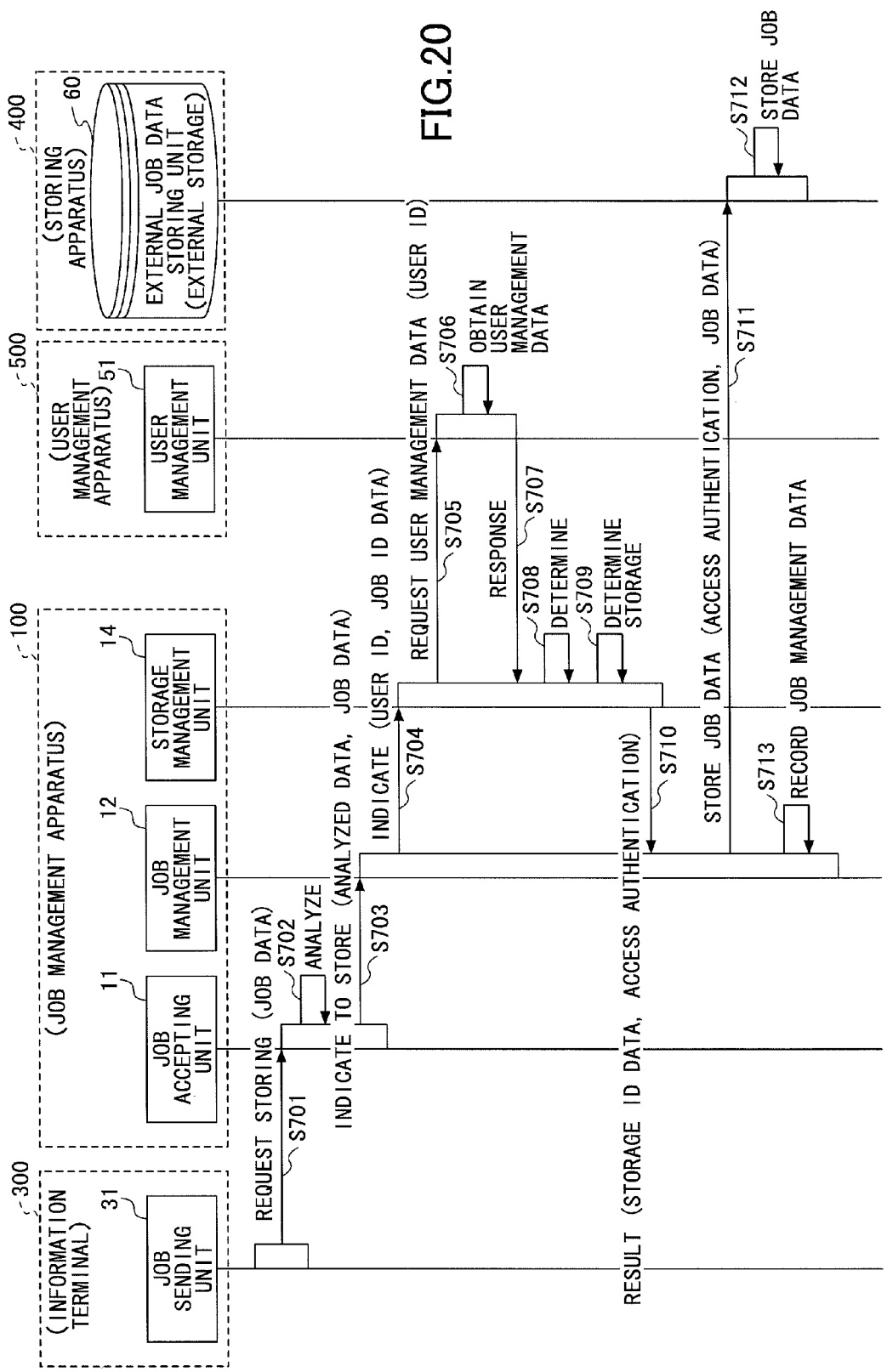

JOB MANAGEMENT APPARATUS CONNECTED TO AN EXTERNAL STORAGE VIA A NETWORK, INCLUDING A STORAGE MANAGEMENT UNIT THAT DETERMINES WHETHER TO STORE JOB DATA IN THE EXTERNAL STORAGE BASED ON PREDETERMINED TRANSFER CONDITION

BACKGROUND OF THE INVENTION

1. Field of the Invention

The present invention relates to a job management apparatus, a method of managing a job and a recording medium storing the method.

2. Description of the Related Art

In Patent Document 1, for example, a technique in which a job which is stored as job data in a server is executed by an image processing apparatus, and a history of the execution of the job is recorded in the server, is disclosed.

However, according to the conventional method, in order to reduce a load on the server caused by storing job data, or in other words, in order to reduce utilization of a memory area of the server by the stored job data, there may be a case where the job data stored in the server for more than a predetermined storing period is automatically deleted. In such a case, the job of the deleted job data cannot be executed. Thus, it is desirable to flexibly manage storing of job data.

PATENT DOCUMENT

[Patent Document 1] Japanese Laid-open Patent Publication No. 2008-217718

SUMMARY OF THE INVENTION

The present invention is made in light of the above problems, and provides a job management apparatus, a method of managing jobs, and a recording medium storing the method capable of flexibly controlling storing of job data.

According to an embodiment, there is provided a job management apparatus connected to an external storage via a network, including a storage management unit that determines whether to store job data of a job to be executed by an electronic device in the external storage based on a predetermined transfer condition; and a job management unit that stores the job data in the external storage when the storage management unit determines to store the job data in the external storage.

According to another embodiment, there is provided a method of managing jobs by a job management apparatus connected to an external storage via a network, including a storage management step of determining whether to store job data of a job to be executed by an electronic device in the external storage based on a predetermined transfer condition; and a job management step of storing the job data in the external storage when it is determined that the job data is to be stored in the external storage in the storage management step.

According to another embodiment, there is provided a non-transitory computer-readable recording medium having recorded thereon a program that causes a computer to execute a method of managing jobs including a storage management step of determining whether to store job data of a job to be executed by an electronic device in the external storage based on a predetermined transfer condition; and a job management step of storing the job data in the external storage when it is determined that the job data is to be stored in the external storage in the storage management step.

Note that also arbitrary combinations of the above-described constituents, and any exchanges of expressions in the present invention, made among method, device, system, recording medium, computer program and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 4 is a view showing an example of job management data of the embodiment;

FIG. 5 is a view showing an example of storage management data of the embodiment;

FIG. 6 is a view showing an example of transfer control data of the embodiment;

FIG. 13 is a view showing another example of the transfer control data of the embodiment;

FIG. 16 is a view showing an example of user management data of the embodiment;

FIG. 18 is a view showing another example of user management data of the embodiment;

FIG. 19 is a view showing an example of transfer control data of the embodiment; and FIG. 20 is a sequence diagram showing a process of job management when the job is accepted.

DETAILED DESCRIPTION OF THE PREFERRED EMBODIMENTS

Figure 1:
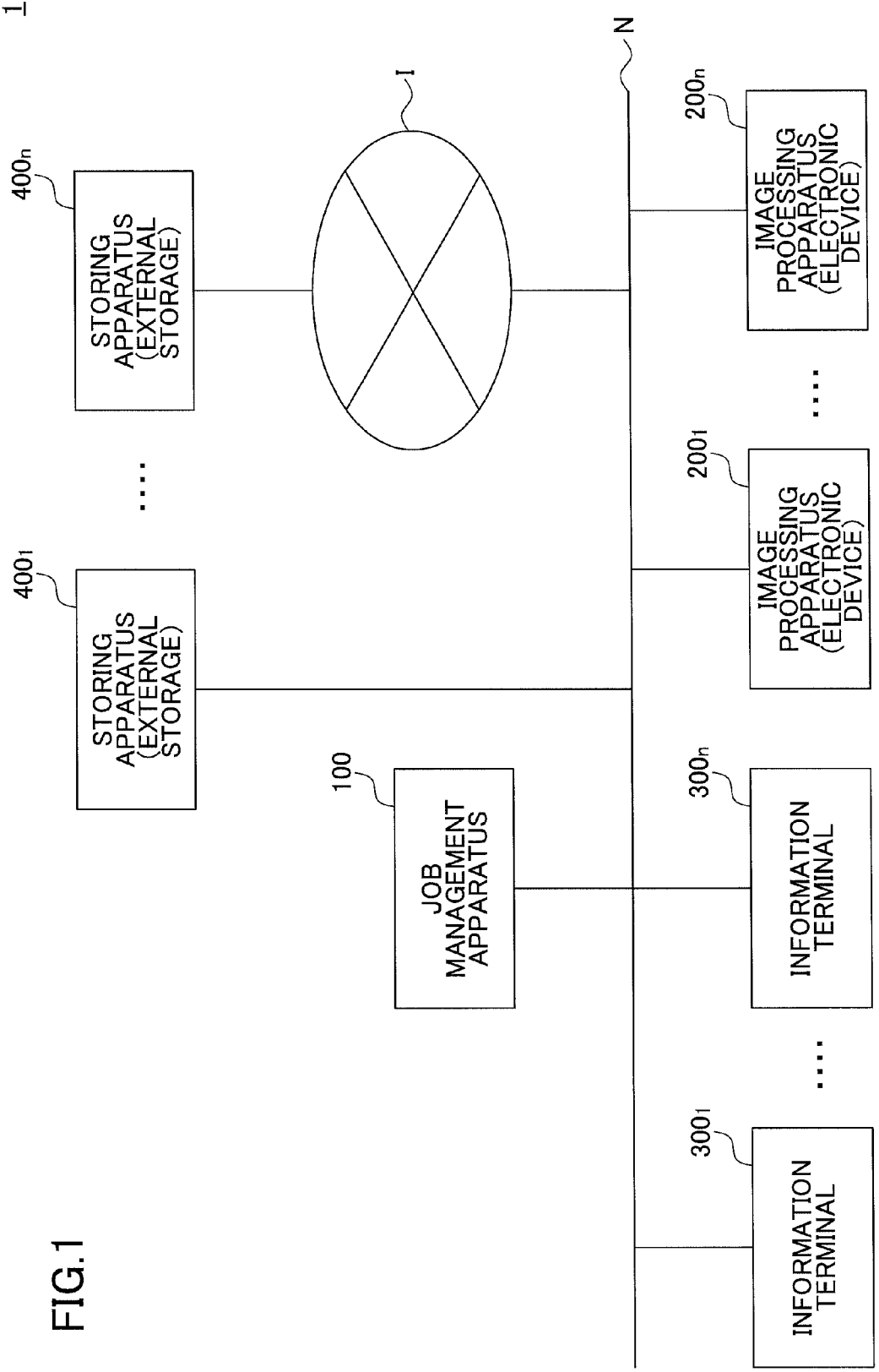
FIG. 1 is a view showing an example of a structure of a job management system of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

First Embodiment

System Structure

FIG. 1 is a view showing an example of a structure of a job management system 1 of the embodiment.

The job management system 1 shown in FIG. 1 includes one or more information terminals $300_1$ to $300_n$ (each of which is simply referred to as an "information terminal 300"), one or more image processing apparatuses $200_1$ to $200_n$ (each of which is simply referred to as an "image processing apparatus 200"), and a job management apparatus 100 which are all connected to a network N such as a Local Area Network (LAN) or the like.

The information terminal 300 is a communication apparatus that requests the job management apparatus 100 to store a job (job data).

The image processing apparatus 200 is an electronic device having an image processing function (a job executing function) including a printing function. The image processing apparatus 200 may be a printer, a Multifunction Peripheral (MFP) or the like.

The job management apparatus 100 is a data processing apparatus having a job management function of managing job data stored in a predetermined storage, and providing the job data to the image processing apparatus 200 in response to a request to send the job data. Further, in this embodiment, the job management apparatus 100 includes an internal storage and provides the internal storage to store job data.

The job management system 1 further includes one or more storing apparatuses $400_1$ to $400_n$ (each of which is simply referred to as a "storing apparatus 400" as well) which are connected to the network N.

The storing apparatus 400 is a storage device having a function of storing job data in a predetermined storage. The storing apparatus 400 provide the predetermined storage to store the job data as an external storage.

Specifically, two kinds of storing apparatuses 400, the storing apparatus $400_1$ and the storing apparatus $400_n$ are shown in FIG. 1. The storing apparatus $400_1$ is directly connected to the network N to which the job management apparatus 100 is also connected. The storing apparatus $400_1$ provides an external storage providing service such as a Network Attached Storing unit (NAS) or the like. The storing apparatus $400_n$ is connected to the network N, to which the job management apparatus 100 is also connected, via an external network I such as the INTERNET or the like. The storing apparatus $400_n$ provides an external storage providing service via the external network I such as Evernote (trademark or registered trademark), quanp (trademark or registered trademark) or the like.

An operation of the image processing apparatus 200 and the job management apparatus 100 when executing a job is explained.

When a user requests sending a job list of job data stored in the internal storage of the job management apparatus 100, the job management apparatus 100 sends the job list of the user in response. Then, the obtained job list is displayed at the image processing apparatus 200.

When the user selects a job to be executed from the job list and requests sending the job data of the selected job, the job management apparatus 100 sends the job data of the selected job in response. Then, the obtained job data is processed in the image processing apparatus 200, and a history of the execution of the job is reported to the job management apparatus 100.

Upon receiving the history of the execution of the job, the job management apparatus 100 determines whether to transfer the job data of the executed job stored in the internal storage to the external storage of the storing apparatus 400 in accordance with a predetermined transfer condition. Then, when it is determined to transfer the job data to the external storage of the storing apparatus 400, the job management apparatus 100 transfers the job data to the storing apparatus 400 and deletes the job data from the internal storage of the management apparatus 100.

As described above, according to the job management system 1 of the embodiment, a job management service of managing storages to store job data in accordance with a predetermined transfer condition is provided.

(Hardware Structure)

Figure 2:
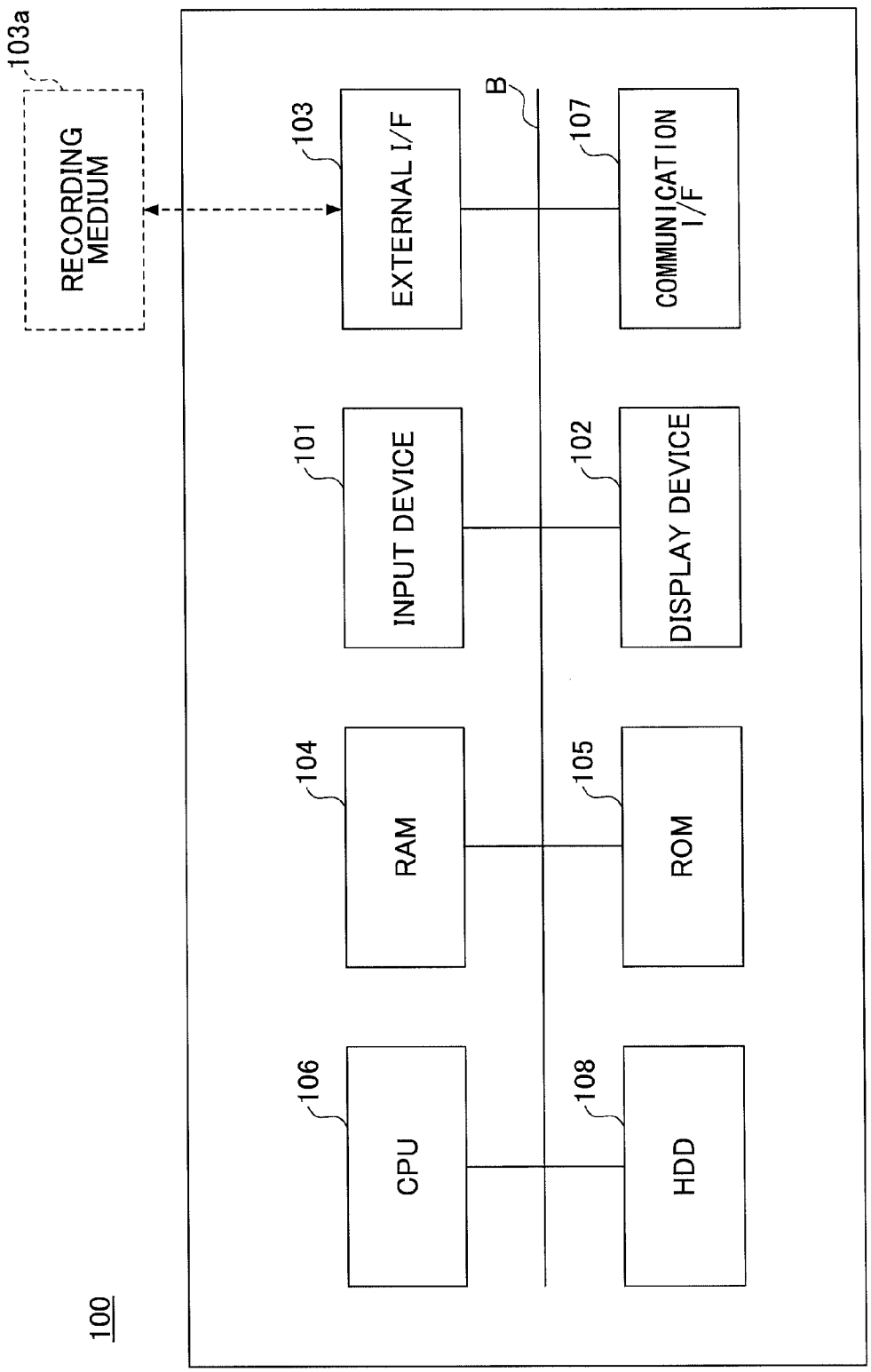
FIG. 2 is a block diagram showing an example of a hardware structure of a job management apparatus of the embodiment.

FIG. 2 is a block diagram showing an example of a hardware structure of the job management apparatus 100 of the embodiment.

As shown in FIG. 2, the job management apparatus 100 includes an input device 101, a display device 102, an external interface (I/F) 103, a Random Access Memory (RAM) 104, a Read Only Memory (ROM) 105, a Central Processing Unit (CPU) 106, a communication interface (I/F) 107, a Hard Disk Drive (HDD) 108 and the like, which are connected with each other via a BUS B.

The input device 101 includes a keyboard, a mouse or the like and is used for inputting various operational signals to the job management apparatus 100. The display device 102 includes a display or the like and displays a result of processing by the job management apparatus 100.

The communication I/F 107 connects the job management apparatus 100 to a network such as the network N shown in FIG. 1. With the function of the communication I/F 107, the job management apparatus 100 is capable of communicating with other apparatuses such as the image processing apparatus 200, the information terminal 300, the storing apparatus 400 or the like via the communication I/F 107.

The HDD 108 is a nonvolatile storage device storing programs or data. The programs or data stored in the HDD 108 may be an Operating System (OS) which is basic software controlling the entirety of the apparatus, application software providing various functions on the OS, or the like. The HDD 108 manages the programs or data stored therein by a predetermined file system and/or a Data Base (DB).

The external I/F 103 is an interface for an external device such as a recording medium 103a or the like. With the function of the external I/F 103, the job management apparatus 100 is capable of reading data from and/or writing data in the recording medium 103a via the external I/F 103. The recording medium 103a may be a floppy (registered trademark) disk, a Compact Disk (CD), a Digital Versatile Disk (DVD), an SD memory card, a Universal Serial Bus memory (USB memory) or the like.

The ROM 105 is a nonvolatile semiconductor memory (storage device) capable of storing data even when power is switched off. The ROM 105 stores Basic Input/Output System (BIOS) which is executed when initiating the job management apparatus 100, program or data for setting the OS or network, or the like. The RAM 104 is a volatile semiconductor memory (storage device) temporarily storing programs or data. The CPU 106 is an arithmetic/logic unit which copies the programs or data from the storage devices such as the HDD 108, the ROM 105 or the like to the RAM 104 and actualizes controlling of the entirety of the apparatus and functions of the apparatus.

As described above, according to the job management apparatus 100 of the embodiment, various processing services including the job management service can be provided with the above hardware structure.

Although not shown in the drawings, each of the image processing apparatuses 200 and each of the information terminals 300 have the same hardware structures as explained above with reference to FIG. 2.

(Job Management Function)

The job management function of the embodiment is explained.

In the job management system 1 of the embodiment, the job management apparatus 100 determines whether it is possible to store job data which is under control of the job management apparatus 100 in a predetermined default storage, which is the internal storage of the job management apparatus 100 in this embodiment in accordance with a predetermined transfer condition.

The predetermined transfer condition indicates a condition for not storing the job data in the internal storage of the job management apparatus 100. The predetermined transfer condition may be a condition for prohibiting the job data from being stored in the internal storage of the job management apparatus 100 or a condition of transferring the job data stored in the internal storage of the job management apparatus 100 to another storage such as the external storage. Further, the predetermined transfer condition includes information about an alternative storage to store the job data. In this embodiment, the external storage of the storing apparatuses 400 becomes one of candidates for the alternative storage.

Thus, the job management apparatus 100 determines the alternative storage to store the job data among the candidates for the alternative storage based on the predetermined transfer condition. Then, the job management apparatus 100 stores the job data in the determined alternative storage.

The job management system 1 of the embodiment includes such a job management function.

In a conventional method of managing a job, as described above, in order to reduce a load on the internal storage caused by storing job data, in other words, in order to reduce utilization of a memory area of the internal storage by the stored job data, there may be a case where the job data stored in the internal storage for more than a predetermined storing period is automatically deleted. In such a case, the job of the deleted job data cannot be executed. Further, recently, as there have been developed external storage providing services provided via a network, a user may wish to use the external storage providing service as a storage to store the job data.

Thus, it is desirable to flexibly manage job data stored in the internal storage with consideration of reducing utilization of the internal storage and convenience in service. In other words, it is desirable to flexibly manage storages to store the job data with a certain degree of freedom.

Thus, the job management apparatus 100 of the embodiment is configured to manage the storing of job data in accordance with the predetermined transfer condition in cooperation with the storing apparatus 400 that provides the external storage.

Thus, the job management system 1 of the embodiment provides an environment in which stored jobs are managed with consideration of reducing utilization of the internal storage and convenience in service. As a result, in the job management system 1 of the embodiment, a flexible job management service can be provided.

The job management function of the embodiment is explained.

Figure 3:
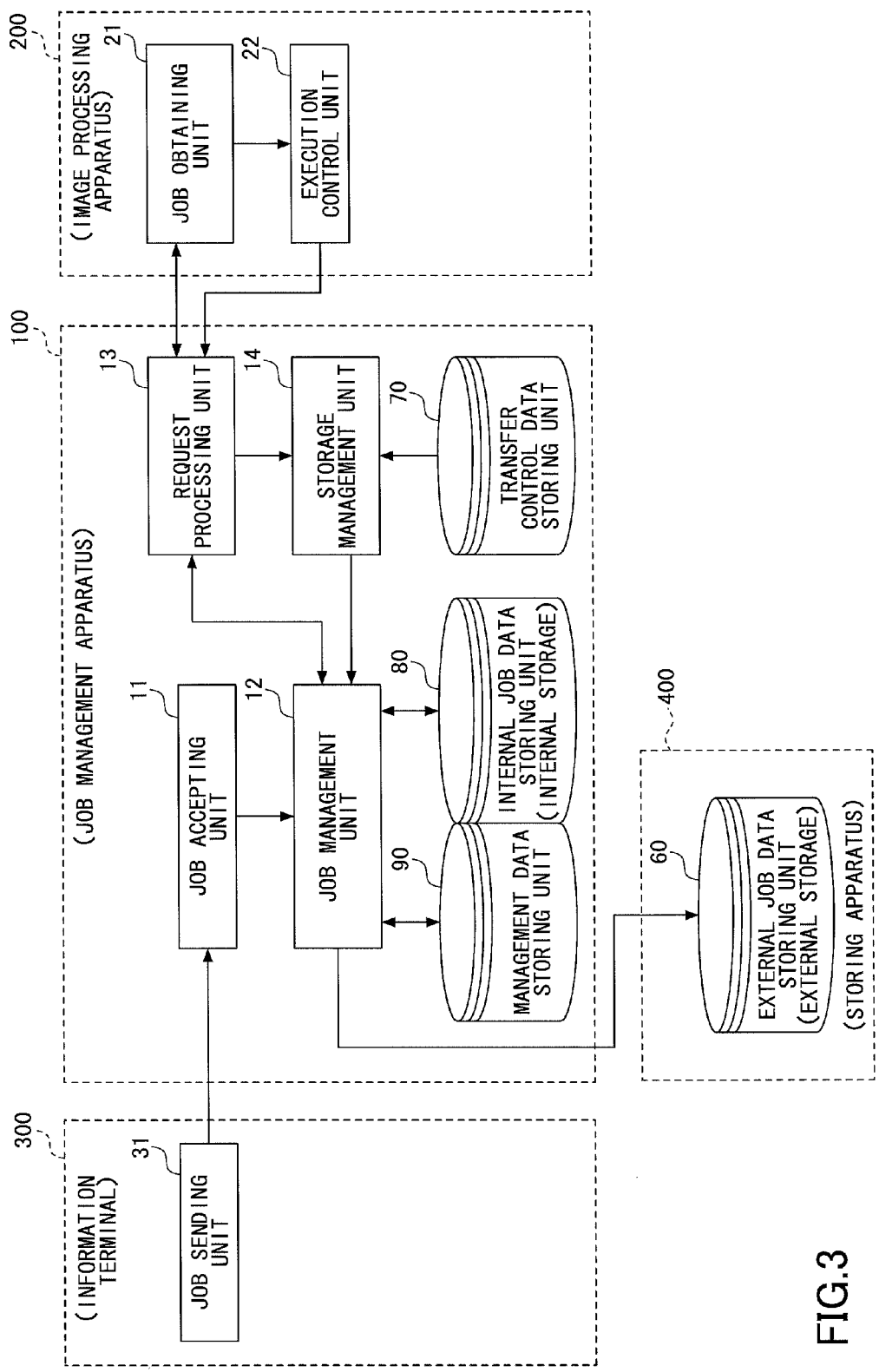
FIG. 3 is a block diagram showing an example of functional components to perform a job management function of the embodiment.

FIG. 3 is a block diagram showing an example of functional components to perform the job management function of the embodiment.

The job management apparatus 100 includes a job accepting unit 11, a job management unit 12, a request processing unit 13, and a storage management unit 14 to perform the job management function of the embodiment. The job management apparatus 100 further includes a transfer control data storing unit 70, an internal job data storing unit 80, and a management data storing unit 90. The transfer control data storing unit 70, the internal job data storing unit 80 and the management data storing unit 90 are predetermined storing areas of the job management apparatus 100. Further, the internal job data storing unit 80 corresponds to the internal storage of the job management apparatus 100.

The image processing apparatus 200 includes a job obtaining unit 21, and an execution control unit 22 to perform the job management function of the embodiment.

The information terminal 300 includes a job sending unit 31 to perform the job management function of the embodiment.

The storing apparatus 400 includes an external job data storing unit 60. The external job data storing unit 60 corresponds to the external storage area of the storing apparatus 400.

As described above, the job management function of the embodiment is actualized by a combination of the components of the apparatuses.

(Information Terminal 300)

The job sending unit 31 requests storing job data by sending the job data to the job management apparatus 100. The job data may be generated by a job data generating function (for example, a function actualized by software such as a printer driver or the like) of the information terminal 300.

(Image Processing Apparatus 200)

The job obtaining unit 21 obtains job data, a job list (information about the job data) or the like from the job management apparatus 100.

Specifically, the job obtaining unit 21 requests sending of the job list of a user by sending user ID data of the user to the job management apparatus 100 and obtains the job list. Upon obtaining the job list, the image processing apparatus 200 displays it on an operations panel capable of selecting a job to be executed based on the obtained job list, and accepts an operation by the user.

Further, upon accepting an operation by the user, the job obtaining unit 21 requests obtaining the job data of the selected job to be executed by sending job ID data of the job to the job management apparatus 100. Then, the image processing apparatus 200 obtains the corresponding job data from the job management apparatus 100.

The execution control unit 22 controls an execution of the job. The execution control unit 22 executes the job of the job data obtained by the job obtaining unit 21, and reports an executed result (the history of the execution of the job) to the job management apparatus 100. The execution control unit 22 may report an apparatus use history value of the image processing apparatus 300 as information indicating that the job is normally executed, with the job ID data of the executed job. When the job is printing, the apparatus use history value may be the number of printed papers, a counter value of the image processing apparatus 200 after printing, or the like.

(Job Management Apparatus 100)

The job accepting unit 11 of the job management apparatus 100 accepts the job data sent from the job sending unit 31 of the information terminal 300. The job accepting unit 11 accepts a request to store the job data upon receiving the job data. Further, the job accepting unit 11 analyzes the accepted job data, and obtains analyzed data from the job data. The analyzed data includes a user who has requested to store the job data (hereinafter, referred to as a "storage user"), a bibliography of the job, size of the job data or the like. The job accepting unit 11 outputs the job data and the analyzed data to the job management unit 12, which will be explained in the following and indicates to the job management unit 12 to store the job data.

It is assumed that the internal job data storing unit 80 is set as a default storage to store the accepted job data in this embodiment.

Thus, when the job accepting unit 11 indicates to store the accepted job data, the job management unit 12 accesses the internal job data storing unit 80 to store the received job data.

Specifically, the job management unit 12 first accesses the management data storing unit 90 and stores the job data based on storage management data stored in the management data storing unit 90. The management data storing unit 90 stores the storage management data and job management data, which will be explained later.

The storage management data is explained.

FIG. 5 is a view showing an example of storage management data 90D$_S$ of the embodiment.

As shown in FIG. 5, the storage management data 90D$_S$ includes one or more data sets each including items such as area kind, storage ID, method of accessing and the like. One of the data sets is prepared for each of the storages.

The item "area kind" stores data that indicates a kind of area of the storage. Data for the item "area kind" may be values such as "internal", "external" or the like. In this embodiment, the area kind of the internal job data storing unit 80 of the job management apparatus 100 is "internal", and the area kind of the external job data storing unit 60 of the storing apparatus 400 is "external".

The item "storage ID" stores storage ID data. Data for the item "storage ID" may be storage identifier of the storage or the like. The item "method of accessing" stores data related to a method of accessing the storage. Data for the item "method of accessing" may be a storage format of storing data, a transmission method of storing data, or the like.

The data for the above items of the storage management data 90D$_S$ may be previously determined by an administrator or the like. Specifically, candidate storages to store job data are determined in accordance with a content of a service or an operating policy of the service to be provided to users and then data for the above items of the storage management data 90D$_S$ are predefined based on the determined candidate storages.

Referring back to FIG. 3, upon receiving the indication to store the job data from the job accepting unit 11, the management unit 12 accesses the storage management data 90D$_S$ in the management data storing unit 90 and specifies the corresponding data set of the storage management data 90D$_S$ based on the storage ID data of the internal job data storing unit 80. Then, the job management unit 12 accesses the internal job data storing unit 80 in accordance with the method of accessing set in the specified data set of storage management data 90D$_S$ and stores the job data in the internal job data storing unit 80.

Further, the job management unit 12 manages job data by a predetermined data operation.

The job management unit 12 accesses the job management data in the management data storing unit 90 for managing the job data. The job management unit 12 manages the job data by recording and updating the job management data in the management data storing unit 90.

The job management data is explained.

FIG. 4 is a view showing an example of job management data 90D$_J$ of the embodiment.

As shown in FIG. 4, the job management data 90D$_J$ includes one or more data sets, each including items such as job ID, storage user ID, bibliography, storage information, size and the like. One of the data sets is prepared for each job data (each job).

The item "job ID" stores job ID data that identifies the job data. Data for the item "job ID" may be a job identifier (job ID) issued when storing the job data. The item "storage user ID" stores storage user ID data that identifies the storage user. Data for the item "storage user ID" may be a user identifier (user ID) allocated for the storage user. The item "bibliography" stores bibliography data of the stored job data. Data for the item "bibliography" may be bibliography values included in the job data (or a property or the like of the job data). The bibliography values may be a file name of the stored job data, the number of pages, and a setting of the job (a setting of the number of printings or a color setting, for example) or the like.

The item "storage information" stores storage information such as storage ID data that identifies the storage storing the job data, access information to the job data or the like. Data for the item "storage information" may be storage identifier (storage ID) allocated to the storage such as the internal job data storing unit 80, the external job data storing unit 60 or the like, Uniform Resource Identifier (URI) to the stored job data or the like. The item "size" stores size data of the job data. The data for the item "size" may be a data size value of the stored job data or the like.

Referring back to FIG. 3, when the job management unit 12 stores the accepted job data in the internal job data storing unit 80, the job management unit 12 generates a new data set of the job management data 90D$_J$ based on the analyzed data of the job data obtained by the job accepting unit 11, and records the data set for the stored job data. Specifically, the job management unit 12 accesses the management data storing unit 90 first, and generates a new data set (record) with job ID data issued for the accepted job data. Then, the job management unit 12 records values included in the analyzed data such as storage user ID data, bibliography data, size data for the stored job data to correspond to the items such as "storage user ID", "bibliography", "size" and the like, of the new data set of the job management data 90D$_J$. Further, the job management unit 12 records the storage ID data of the storage storing the job data and access information to the stored job data to correspond to the items of the "storage information".

The request processing unit 13 processes a communication between the job management unit 100 and the job obtaining unit 21 or the execution control unit 22 of the image processing apparatus 200.

The request processing unit 13 receives a request to send a job list (information about the stored job data) with the user ID data of the user from the job obtaining unit 21 of the image processing apparatus 200. Then, the request processing unit 13 outputs the user ID data to the job management unit 12 and indicates to the job management unit 12 to obtain the job list.

Upon receiving the request to send the job list from the job obtaining unit 21 of the image processing apparatus 200 via the request processing unit 13, the job management unit 12 obtains the data sets of the job management data 90D$_J$ of the corresponding stored job data from the management data storing unit 90, and sends the obtained data sets of the job management data 90D$_J$ as the job list to the image processing apparatus 200 in response.

Specifically, the job management unit 12 accesses the management data storing unit 90, and specifies the data sets of the job management data 90D$_J$ related to the user requesting to send the job list based on the user ID data of the user which is obtained with the request. The job management unit 12 sends the specified data sets of the job management data 90D$_J$ in a form of the job list in response.

Thereafter, upon receiving the job list from the job management unit 12, the request processing unit 13 sends the received job list to the job obtaining unit 21 in response.

Further, the request processing unit 13 receives a request to send the job data of the job to be executed with the job ID data of the job from the job obtaining unit 21 of the image processing apparatus 200. Then, the request processing unit 13 outputs the job ID data to the job management unit 12 and indicates to the job management unit 12 to obtain the job data.

Upon receiving the request to send the job data of the job to be executed from the job obtaining unit 21 of the image processing apparatus 200 via the request processing unit 13, the job management unit 12 obtains the corresponding job data from the internal job data storing unit 80, and sends the obtained job data to the image processing apparatus 200 in response.

Specifically, the job management unit 12 accesses the management data storing unit 90, and specifies the corresponding data set of the job management data 90D$_J$ based on the job ID data of the requested job data which is obtained with the request. Then, the job management unit 12 obtains the storage information of the specified data set. Thereafter, the job management unit 12 specifies the corresponding data set of the storage management data 90D$_S$ based on the storage ID data included in the obtained storage information. At this time, it is assumed that the storage ID data of the internal job data storing unit 80 is obtained.

Then, the job management unit 12 accesses the internal job data storing unit 80 in accordance with the method of accessing the specified data set of the storage management data 90D$_S$. The job management unit 12 obtains the job data based on the access information for the job data included in the obtained storage information, and sends the obtained job data in response.

Thereafter, upon receiving the job data from the job management unit 12, the request processing unit 13 sends the received job data to the job obtaining unit 21 in response.

Further, the request processing unit 13 receives an execution result report of the job with the job ID data of the job from the execution control unit 22 of the image processing apparatus 200. Then, the request processing unit 13 outputs the job ID data to the storage management unit 14, which will be explained later, and indicates to the storage management unit 14 to perform management of the storages to store job data.

In this embodiment, the management of the storages is performed after the job data is processed by the execution control unit 22 of the image processing apparatus 200. In other words, the management of the storages is performed for the job data which has already been processed.

The storage management unit 14 manages the storages to store the job data. The transfer control data storing unit 70 stores transfer control data including one or more predetermined transfer conditions. As described above, the predetermined transfer condition indicates a condition for not storing the job data in the internal storage of the job management apparatus 100 in this embodiment.

The storage management unit 14 accesses the transfer control data storing unit 70, and manages the storage of the job data based on the stored transfer control data.

The transfer control data is explained.

FIG. 6 is a view showing an example of transfer control data 70D of the embodiment.

As shown in FIG. 6, the transfer control data 70D includes one or more data sets, each including items such as control parameter, transfer condition, new storage ID, priority and the like. At least one of the data sets is prepared for each of the transfer conditions.

The item "transfer condition" stores transfer condition data that indicates the predetermined transfer condition as described above. Data for the item "transfer condition" may be a conditional expression of the transfer condition such as "the number of jobs having job data stored in the internal job data storing unit 80 is more than or equal to 1000?" (Job.Count≥1000), "data size value of the processed job data is more than or equal to 10 MB?" (Job.Size≥10 MB) or the like.

The item "control parameter" stores control parameter data that indicates a variable to be used in the transfer condition. Data for the item "control parameter" may be the number of jobs having job data stored in the internal job data storing unit 80 (Job.Count), data size of the processed job data (Job.Size) or the like which is determined in accordance with the item "transfer condition".

The item "new storage ID" stores storage ID data of a storage in which the job data is to be stored when the transfer condition is satisfied.

The item "priority" stores priority data that indicates priority for examining the transfer condition. Data for the item "priority" may be priority data composed of a numeral such as an integer within a predetermined range (one of 1 to N, for example).

The data for the above items of the transfer control data 70D may be previously determined by an administrator or the like. Specifically, the transfer conditions are determined in accordance with a content of a service or an operating policy of the service to be provided to users and then data for the above items of the transfer control data 70D are predefined based on the determined transfer conditions. Then, the data for the items are determined based on the determined transfer conditions. The transfer conditions are not limited to the above described example.

The transfer condition may be "whether a predetermined word (such as "confidential" or the like) or a predetermined phrase (such as "internal use only" or the like) is included in the job?", "whether the accumulated use value (an accumulated printed number) is more than or equal to a predetermined value?" or the like. The transfer conditions may be appropriately determined.

Referring back to FIG. 3, upon receiving the indication to perform the management of the storages from the request processing unit 13, the storage management unit 14 accesses the transfer control data storing unit 70 and specifies the data set based on the priority data of the transfer control data 70D.

Then, the storage management unit 14 obtains a variable value stored in the job management apparatus 100 based on the control parameter data of the specified data set. Subsequently, the storage management unit 14 inputs the obtained variable value to the conditional expression of the transfer condition data of the specified data set.

Then, the storage management unit 14 determines whether the transfer condition is satisfied based on the input result. When the transfer condition is satisfied, the storage management unit 14 determines a new storage to store the job data based on the new storage ID data of the specified data set.

When the transfer condition is not satisfied, the storage management unit 14 specifies the data set for which the priority is the next highest based on the priority data of the transfer control data 70D, and repeats the same operation.

For example, the next processes are performed when the storage management unit 14 performs the management of the storages to store job data using the transfer control data 70D shown in FIG. 6.

First, as the priority data "1" is set for the transfer condition "Job.Count≥1000" and the new storage ID "external 01", the storage management unit 14 obtains the number of the jobs having job data stored in the internal job data storing unit 80. Then, the storage management unit 14 determines whether the number of the jobs having stored job data is more than or equal to 1000 based on the obtained value.

When the number of the jobs having stored job data is more than or equal to 1000, the storage management unit 14 determines to transfer the job data to the storage identified by "external 01" as a new storage to store the job data.

On the other hand, when the number of the jobs having stored job data is less than 1000, as the priority data "2" to "4" are set for the transfer condition "Job.Size≥10 MB" and the new storage ID "external 02", "external 03" and "external 04", the storage management unit 14 obtains the data size value of the processed job data for which the execution result report is received. Then, the storage management unit 14 determines whether the data size value of the processed job data is more than or equal to 10 MB.

When the data size value of the executed job is more than or equal to 10 MB, the storage management unit 14 determines the storages identified by "external 02", "external 03" and "external 04" as candidates for a new storage to store the job data.

When the storage management unit 14 determines the new storage to store the job data, the storage management unit 14 reports a control result including the storage ID data of the determined new storage to the job management unit 12.

Upon receiving the control result report, the job management unit 12 accesses the internal job data storing unit 80 which is now storing the job data, obtains the job data to transfer, and stores the obtained job data in the determined new storage. In other words, the job management unit 12 changes the storage in which to store the job data based on the control result report.

Here, "change" means as follows. The Job data is stored in the internal job data storing unit 80, which is the internal storage as the default storage. However, with consideration of reducing utilization of the internal storage and convenience in service, the job data is to be stored in the storage, different from the internal job data storing unit 80. The storage different from the internal job data storing unit 80 may be the external job data storing unit 60, which is the external storage and a candidate for the alternative storage.

Upon receiving a control result report indicating the job data is to be stored in the external job data storing unit 60, for example, the job management unit 12 obtains the job data to transfer from the internal job data storing unit 80 by the same processes as those performed when the request to send the job data is received, as described above.

The job management unit 12 accesses the management data storing unit 90, and specifies the data set of the storage management data $90D_S$ based on the new storage ID data which is obtained with the control result report. The job management unit 12 accesses the external job data storing unit 60 in accordance with the method of accessing of the specified data set. Then, the job management unit 12 stores the obtained job data. When the job management unit 12 succeeds in storing the job data in the external job data storing unit 60, the job management unit 12 deletes the job data transferred and stored in the external job data storing unit 60 from the internal job data storing unit 80.

Further, the job management unit 12 updates the corresponding data set of the job management data $90D_J$ for which the storage to store the job data is changed. The job management unit 12 accesses the management data storing unit 90 and specifies the corresponding data set of the job management data $90D_J$ based on the job ID data of the transferred job data for which the storage to be stored in is changed. Then, the job management unit 12 changes the data of the item "storage information" of the specified data set to the storage ID data of the new storage and the access information of the job data in the new storage. Thus, the job management unit 12 reflects data of the new storage to store the job data in the job management data $90D_J$.

As described above, the job management apparatus 100 manages the stored job data using the job management data $90D_J$.

Further, when there are plural candidates for the new storage, the storage management unit 14 reports the control result including the storage ID data of the plural candidates in an order of the priority; in other words, the storage management unit 14 reports to the job management unit 12 in order of the priority. With this operation, even when the job management unit 12 fails to store the job data in the determined new storage with the highest priority, it is possible for the job management unit 12 to store the job data in other storages in the reported order.

For example, for the case explained above referring to FIG. 6, as the higher priority is set for the storages identified by "external 02", "external 03" and "external 04" in this order, the storage management unit 14 reports them to the job management unit 12 in order of "external 02", "external 03" and "external 04". In this case, the job management unit 12 tries to store the job data in the storage identified by "external 02", first. Then, if the job management unit 12 fails to store the job data in the storage identified by "external 02", the job management unit 12 tries to store the job data in the storage identified by "external 03", next.

As described above, the job management apparatus 100 performs the management of the storages to store job data in accordance with the predetermined transfer conditions in cooperation with the storing apparatus 400.

The job management function of the embodiment is actualized by a combination of the components. Further, the above functional components are actualized when CPUs read programs installed in the apparatuses or devices composing the job management system 1 from the storage devices (HDDs or ROMs) on the memories (RAMs), respectively.

The job management function of the embodiment is explained in detail with reference to a sequence diagram and a flowchart. The operation of the job management function includes following two processes.

Specifically, a first process is a management of the storages to store job data after the job data is processed by the image processing apparatus 200, and a second process is a management of the storages to store job data when accepting job data (when receiving a request to store the job data).

In the above explanation, the management of storing job data is performed when the job data is processed by the image processing apparatus 200. However, the storage in which to store the job data may be managed when new job data to store is accepted by the job management apparatus 100.

(First Process)

Figure 7:
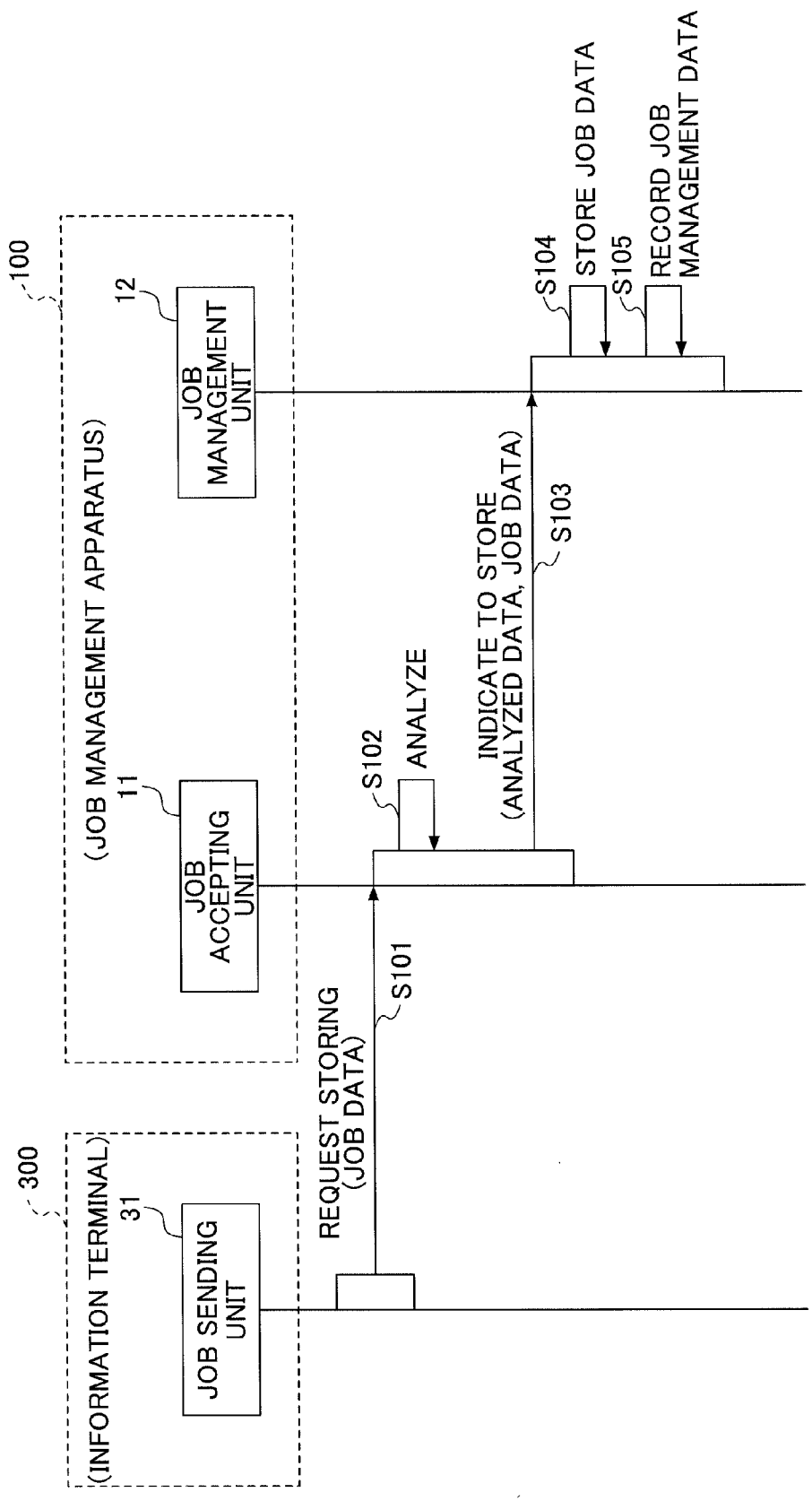
FIG. 7 is a sequence diagram showing a process of job management when job data is accepted.

FIG. 7 is a sequence diagram showing a process of job management when the job data is accepted. In the following, an example is explained where a user identified by the storage user ID "UserB" stores job data identified by the job ID "Job_2" in the internal job data storing unit 80 of the job management apparatus 100 which is identified by the storage ID "internal 01".

As shown in FIG. 7, in the information terminal 300, the job sending unit 31 sends job data to the job accepting unit 11 of the job management apparatus 100 for requesting storing of the job data (step S101).

In the job management apparatus 100, upon receiving the request to store the job data, the job accepting unit 11 analyzes the received job data (step S102). Specifically, the job accepting unit 11 obtains data such as the storage user ID "UserB", bibliography of the job "(file name: Memo.txt, . . . , the number of printings: 1, color setting: monochrome, . . . )", size of the job data "128" and the like as an analyzed result of the job data.

The job accepting unit 11 outputs the obtained data from the analyzed result (the analyzed data) and the job data to the job management unit 12, and indicates to the job management unit 12 to store the job data (step S103).

Upon receiving the indication to store the job data, the job management unit 12 accesses the internal job data storing unit 80, and stores the received job data (step S104). Specifically, the job management unit 12 accesses the management data storing unit 90, and specifies the corresponding data set of the storage management data $90D_S$ based on the storage ID data "internal 01" (default) of the internal job data storing unit 80. The job management unit 12 accesses the internal job data storing unit 80 identified by "internal 01" in accordance with the method of accessing "FileSystem, file:¥¥D¥Storage¥ . . . " of the specified data set, and stores the job data in the internal job data storing unit 80.

The job management unit 12 generates a new data set of the job management data $90D_J$ based on the received analyzed data, and records data for the stored job data (step S105). Specifically, the job management unit 12 accesses the management data storing unit 90, first, and generates a new data set (record) including the job ID data "J0002" for the item "job ID" which is issued for the received job data. Then, the job management unit 12 records the data included in the analyzed data such as the storage user ID data "UserB", the bibliography data "(file name: Memo.txt, . . . , the number of printings: 1, color setting: monochrome, . . . )", the size data of the job data "128" and the like to the items "storage user ID", "bibliography", "size" and the like, respectively. Then, the job management unit 12 records the storage ID data "internal 01" and the access information to the job data stored in the internal job data storing unit 80 "file:¥D¥¥Storage¥UserB¥Job_2" for the items "storage information" of the new data set, respectively.

Figure 8:
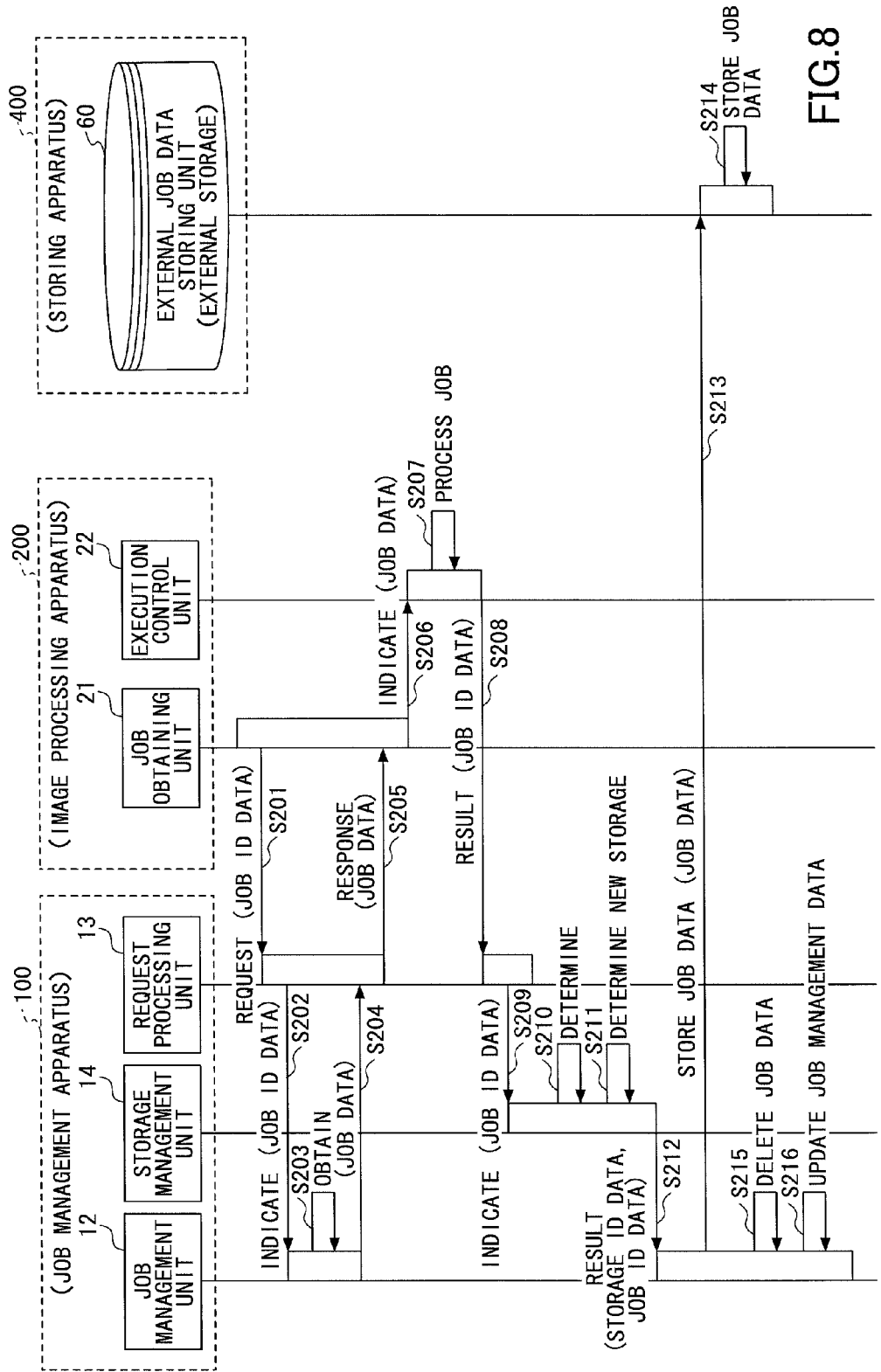
FIG. 8 is a sequence diagram showing an example of the job management function of the embodiment.

FIG. 8 is a sequence diagram showing an example of the job management function of the embodiment. Here, processes after the job data to be executed is selected at the image processing apparatus 200 via the operations panel, which is displayed based on the job list obtained from the job management apparatus 100, are shown. In the following, an example is explained where the user "UserB" selects the job data "Job_2" stored in the internal job data storing unit 80 of the job management apparatus 100 identified by "internal 01" to be executed.

As shown in FIG. 8, in the image processing apparatus 200, the job obtaining unit 21 requests sending the job data of the selected job data to be executed by sending the job ID data "J002" to the request processing unit 13 of the job management apparatus 100 (step S201).

In the job management apparatus 100, upon receiving the request to send the job data, the request processing unit 13 outputs the job ID data "J002" to the job management unit 12 and indicates to the job management unit 12 to obtain the job data (step S202).

Upon receiving the indication to obtain the job data, the job management unit 12 accesses the internal job data storing unit 80, and obtains the job data "Job_2" based on the received job ID data "J002" (step S203). The job management unit 12 outputs the obtained job data "Job_2" to the request processing unit 13 (step S204).

Specifically, the job management unit 12 accesses the management data storing unit 90, and specifies the corresponding data set of the job management data $90D_J$ (see FIG. 4) based on the received job ID data "J002" of the job data to be executed. Then, the job management unit 12 obtains the storage information "internal 01, file: ¥D¥¥Storage¥UserB¥Job_2" of the specified data set. The job management unit 12 specifies the corresponding data set of the storage management data $90D_S$ (see FIG. 5) based on the storage ID data "internal 01" of the obtained storage information. The job management unit 12 accesses the internal job data storing unit 80 in accordance with the method of accessing "file:¥¥D¥Storage¥ . . . " based on the method of accessing "FileSystem, file:¥¥D¥Storage¥ . . . " of the specified data set. Then, the job management unit 12 obtains the corresponding job data "Job_2" based on the access information to data "file:¥D¥¥Storage¥UserB¥Job_2" of the obtained storage information, and outputs the obtained job data "Job_2" to the request processing unit 13.

Thereafter, the request processing unit 13 100 sends the obtained job data "Job_2" to the image processing apparatus 200 in response (step S205).

In the image processing apparatus 200, upon receiving the job data "Job_2", the job obtaining unit 21 outputs the obtained job data "Job_2" to the execution control unit 22 and indicates to the execution control unit 22 to process the job data (step S206).

Upon receiving the indication to process the job data, the execution control unit 22 processes the obtained job data (step S207), and sends an execution result report including the job ID data "J002" of the processed job data to the request processing unit 13 of the job management apparatus 100 (step S208).

In the job management apparatus 100, upon receiving the execution result report, the request processing unit 13 outputs the job ID data "J002" to the storage management unit 14, and indicates to the storage management unit 14 to perform the management of the storages (step S209).

Upon receiving the indication to perform the management of the storages, the storage management unit 14 determines whether the predetermined transfer condition is satisfied for the processed job data (step S210).

Here, it is assumed that the predetermined transfer condition is satisfied. At this time, the storage management unit 14 determines a new storage to store the job data (the storage identified by "external 01" in this case, for example) from the candidates for the alternative storage based on the determined result (step S211).

Thereafter, when the storage management unit 14 determines the new storage to store the job data, the storage management unit 14 reports a control result including the storage ID data "external 01" of the determined new storage and the job ID data "J002" of the processed job data (step S212) to the job management unit 12.

Upon receiving the control result report, the job management unit 12 accesses the external job data storing unit 60 identified by "external 01" of the determined storage based on the method of accessing "SMB, ¥¥NAS¥Storage¥ . . . " (see FIG. 5) specified by the received storage ID data "external 01". Then, the job management unit 12 stores the job data "Job_2" obtained from the internal job data storing unit 80 based on the job ID data "J002" (step S213). With this operation, when the job data is processed and the predetermined transfer condition is satisfied, the job data is transferred to and stored in the external storage (the external job data storing unit (step S214).

When the job management unit 12 succeeds in storing the job data, the job management unit 12 deletes the job data "Job_2" from the internal job data storing unit 80 (step S215).

The job management unit 12 updates the data set of the job management data $90D_J$ of the job data for which the storage in which to store is changed (step S216). With this operation, when the predetermined transfer condition is satisfied, the processed job data is transferred to and stored in the external job data storing unit 60 of the storing apparatus 400 (identified by "external 01") from the internal job data storing unit 80 of the management apparatus 100 (identified by "internal 01").

(Management of Storages)

Figure 9:
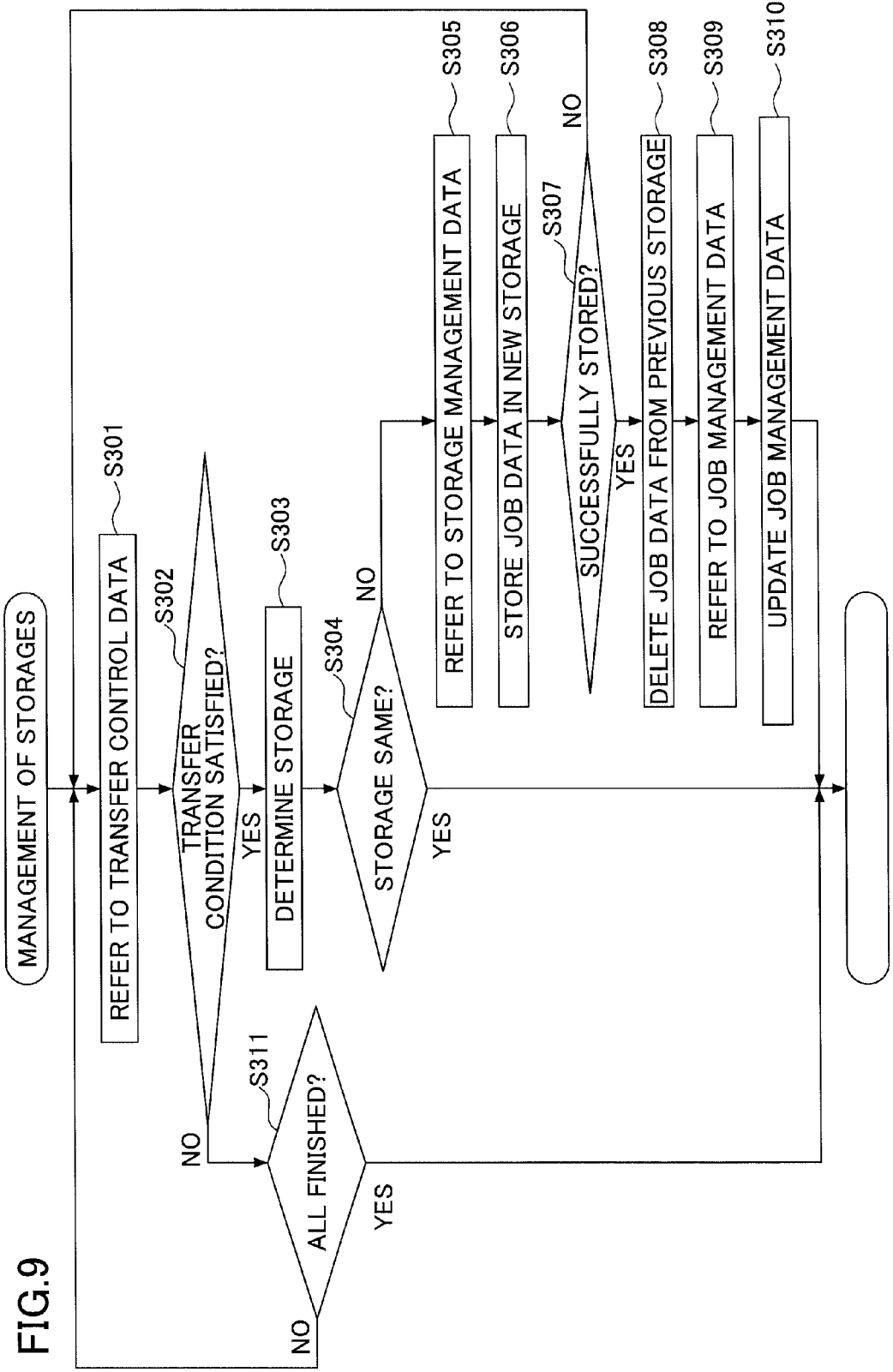
FIG. 9 is a flowchart showing an example of performing a management of storages after the job data is processed of the embodiment.

FIG. 9 is a flowchart showing an example of performing the management of the storages after the job data is processed of the embodiment. The processes corresponding to steps S210 to S216 of FIG. 8 (the operation of the storage management unit 14 in cooperation with the job management unit 12) are shown.

As shown in FIG. 9, upon receiving the indication to perform the management of the storages, the storage management unit 14 accesses the transfer control data storing unit 70, and refers to the transfer control data 70D (step S301). Specifically, the storage management unit 14 specifies the data set of the transfer control data 70D with the highest priority based on the priority data "1, 2, 3, 4 or the like".

Then, the storage management unit 14 determines whether the transfer condition of the specified data set is satisfied (step S302).

Here, it is assumed that the storage management unit 14 specifies the data set with the priority data "1" (see FIG. 6). At this time, the control parameter data of the specified data set is "Job.Count". Thus, the storage management unit 14 obtains the number of jobs having job data stored in the internal job data storing unit 80 of the job management apparatus 100 based on the control parameter data "Job.Count". Further, it is assumed that the number of jobs having job data stored in the job management apparatus 100 is "1001" and the storage management unit 14 obtains "1001" as "Job.Count". At this time, the storage management unit 14 inputs the obtained "1001" in "Job.Count" of the conditional expression of the predetermined transfer condition data "Job.Count≥1000" of the specified data set. Then, the storage management unit 14 determines whether the transfer condition is satisfied based on the input result.

When it is determined that the transfer condition is satisfied (step S302: YES), the storage management unit 14 determines a new storage to store the current job data based on the new storage ID data "external 01" of the specified data set (step S303). The storage management unit 14 reports the control result including the storage ID data "external 01" of the determined storage and the job ID data "J002" of the processed job data to the job management unit 12.

When there are plural determined storages, the storage management unit 14 reports the control result including plural storage ID data sets of the determined storages in accordance with the order of priority.

Upon receiving the control result report from the storage management unit 14, the job management unit 12 determines whether the storage is the same before and after (step S304). Specifically, the job management unit 12 accesses the management data storing unit 90 and specifies the corresponding data set of the job management data $90D_J$ based on the received job ID data "J002". The job management unit 12 determines that the storage is the same before and after when the storage ID data of the storage information of the specified data set is the same as the received storage ID data.

When it is determined that the storage is the same before and after (step S304: YES), the job management unit 12 ends the process as it is not necessary to transfer the job data.

On the other hand, when it is determined that the storage is not the same (step S304: NO), the job management unit 12 accesses the management data storing unit 90 and refers to the storage management data $90D_S$ as it is necessary to transfer the job data (step S305).

The job management unit 12 stores the job data in accordance with the method of accessing of the new storage in which to store (step S306). Specifically, the job management unit 12 obtains the job data "Job_2" from the current storage, which is the internal job data storing unit 80, based on the access information to data "file:¥D¥Storage¥UserB¥Job_2" of the storage information of the data set specified by the received job ID data "J002". Further, the job management unit 12 specifies the corresponding data set of the storage management data $90D_S$ based on the received storage ID data "external 01". Then, the job management unit 12 stores the job data "Job_2" obtained from the internal job data storing unit 80 in the external job data storing unit 60 of the storing apparatus 400 which is determined to be the new storage based on the method of accessing data "SMB, ¥¥NAS¥Storage¥ . . . " of the specified data set.

Then, the job management unit 12 determines whether the job data is successfully stored (step S307). At this time, the job management unit 12 may determine whether the job data is successfully stored based on an accessing result of the new storage.

When it is determined that the job data is successfully stored in step S307 (step S307: YES), the job management unit 12 deletes the job data "Job_2" from the previous storage (step S308).

Then, the job management unit 12 refers to the job management data $90D_J$ (step S309), updates the data set (storage information) of the job data for which the storage is changed (step S310), and ends the process. Specifically, the job management unit 12 accesses the management data storing unit 90, and specifies the corresponding data set of the job management data $90D_J$ based on the job ID data "J002" of the job data for which the storage is changed. Then, the job management unit 12 updates the "storage information" of the specified data set by the storage ID data "external 01" and the access information to the job data "¥¥NAS¥Storage¥UserB¥Job_2". With this, the storage to store the processed job data that satisfies the predetermined transfer condition is changed from the job management apparatus 100 (internal storage) to the storing apparatus 400 (external storage).

In step S302, when it is determined that the transfer condition is not satisfied (step S302: NO), the storage management unit 14 determines whether the examinations are performed for all of the data sets (predetermined transfer conditions) of the transfer control data 70D (step S311). When it is determined that not all of the data sets are examined (step S311: NO), the storage management unit 14 proceeds back to step S301, specifies the data set of the next highest priority, and repeats the same operation. When it is determined that all of the data sets are examined in step S311 (step S311: YES), the storage management unit 14 ends the process.

Further, in step S307, when it is determined that the job is not successfully stored (step S307: NO), the job management unit 12 moves back to step S301. At this time, the job management unit 12 specifies the data set of the next highest priority, and repeats the same operation.

There is a case where the storage management unit 14 reports the control result including plural storage ID data from the job management unit 12 in step S303. At this time, even when it is determined that the job is not successfully stored in step S307 (step S307: NO), the job management unit 12 tries to store the job data in the next candidate to store. When it is determined that the job is not successfully stored in all of the candidates for the alternative storage, the job management unit 12 moves back to step S301.

Figure 10:
FIG. 10 is a view showing an example of the job management data when a storage to store job data is changed.

FIG. 10 is a view showing an example of the job management data $90D_J$ when the storage in which to store the job data is changed.

In FIG. 10, (A) shows the job management data $90D_J$ before transferring the job data, and (B) shows the job management data $90D_J$ after the job data is transferred. As shown in FIG. 10, by the management of the storages as described above in the job management apparatus 100, the storage information of the data set R of the user "UserB" and the job data "J002" among the job management data $90D_J$ is changed from the internal job data storing unit 80 of the job management apparatus 100 (the storage identified by "internal 01") to the external job data storing unit 60 of the storing apparatus 400 (the storage identified by "external 01"). Thus, in the job management apparatus 100, when the storage in which to store the job data is changed, information indicating the new storage is updated in the job management data $90D_J$.

As described above, according to the job management function of the embodiment, the storage in which to store the job data is managed in accordance with the predetermined transfer condition in cooperation with the storing apparatus 400 providing an external storage service (after the job is executed).

(Second Process)

Figure 11:
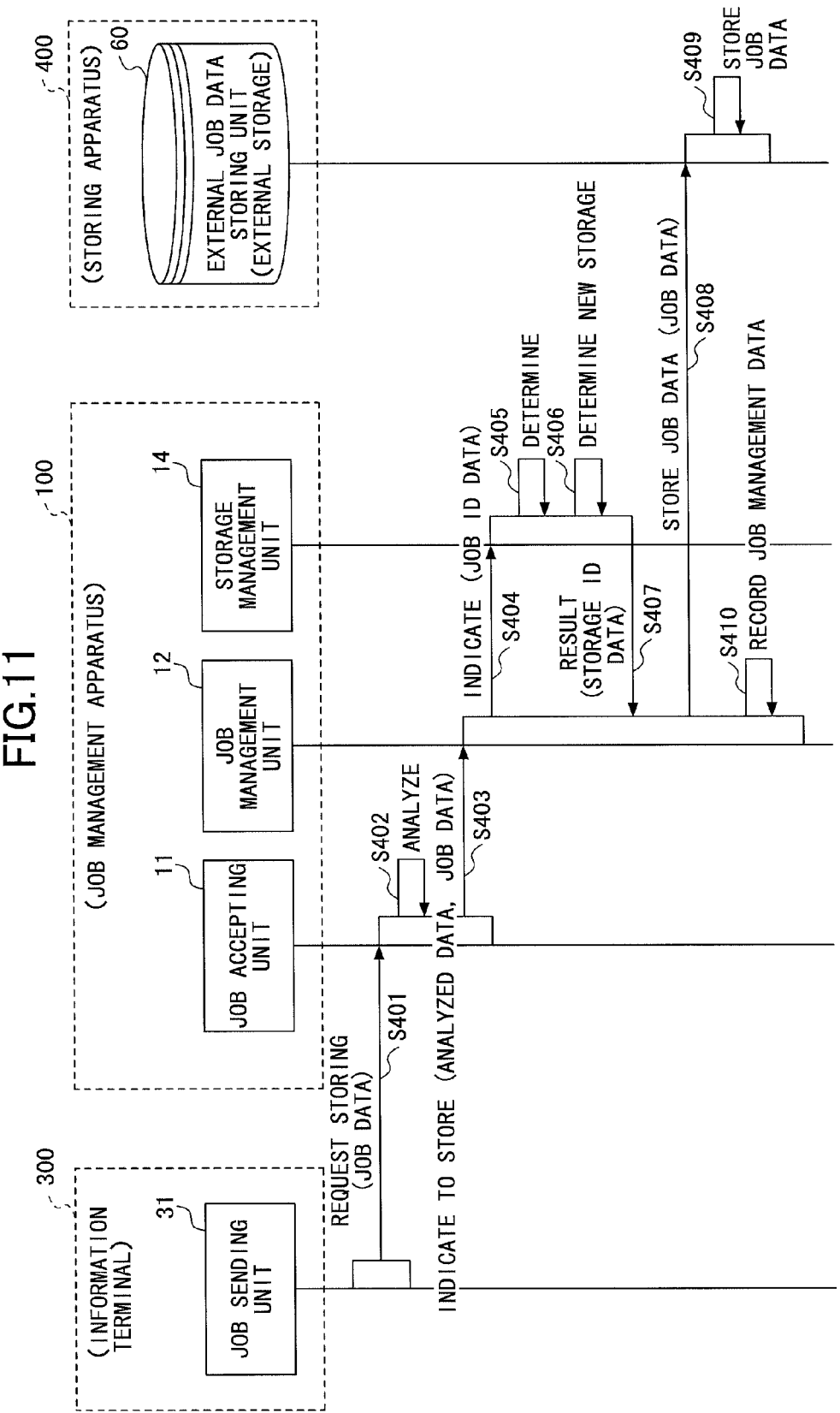
FIG. 11 is a sequence diagram showing a process of job management when the job data is accepted.

FIG. 11 is a sequence diagram showing a process of job management when the job data is accepted. In the following, an example where a user identified by the storage user ID "UserB" stores job data identified by the job ID "Job_2" in the external job data storing unit 60 (external storing area) of the storing apparatus 400 which is identified by the storage ID "external 01".

As shown in FIG. 11, in the information terminal 300, the job sending unit 31 sends job data to the job accepting unit 11 of the job management apparatus 100 for requesting storing of the job data (step S401).

In the job management apparatus 100, upon receiving the request to store the job data, the job accepting unit 11 analyzes the received job data (step S402). Specifically, the job accepting unit 11 obtains data such as the storage user ID "UserB", bibliography of the job "(file name: Memo.txt, . . . , the number of printings: 1, color setting: monochrome, . . . )", size of the job data "128" and the like as an analyzed result of the job data.

The job accepting unit 11 outputs the obtained data from the analyzed result (the analyzed data) and the job data to the job management unit 12, and indicates to the job management unit 12 to store the job data (step S403).

Upon receiving the indication to store the job data, the job management unit 12 outputs the job ID data "J002" to the storage management unit 14 and indicates to the storage management unit 14 to perform the management of the storages (step S404).

Upon receiving the indication to perform the management of the storages, the storage management unit 14 determines whether the predetermined transfer condition is satisfied for the job data to be stored (received job data) (step S405).

The storage management unit 14 determines the storage in which to store the job data. Here, it is assumed that the storage identified by "external 01" is determined from the candidates (step S406).

Then, after determining the storage in which to store, the storage management unit 14 reports a control result including the storage ID data "external 01" of the determined storage to the job management unit 12 (step S407).

Upon receiving the control result report, the job management unit 12 accesses the external job data storing unit 60 of the storing apparatus 400, which is the determined storage to store, based on the method of accessing data "SMB, ¥¥NAS¥Storage¥ . . . " specified by the storage ID data "external 01". Then, the job management unit 12 stores the job data "Job_2" which is received with the request to store the job data (step S408).

With this operation, when the job data satisfies the transfer condition, the job data is stored in the storing apparatus 400 (step S409).

In the job management apparatus 100, when the job data is successfully stored, the job management unit 12 records the data set of the job management data $90D_J$ for the job data (step S410). Thus, a data set of the job management data $90D_J$ including the storage ID data "external 01" of the storing apparatus 400 (external storage) is recorded for the job data that satisfies the predetermined transfer condition.

(Management of Storages)

Figure 12:
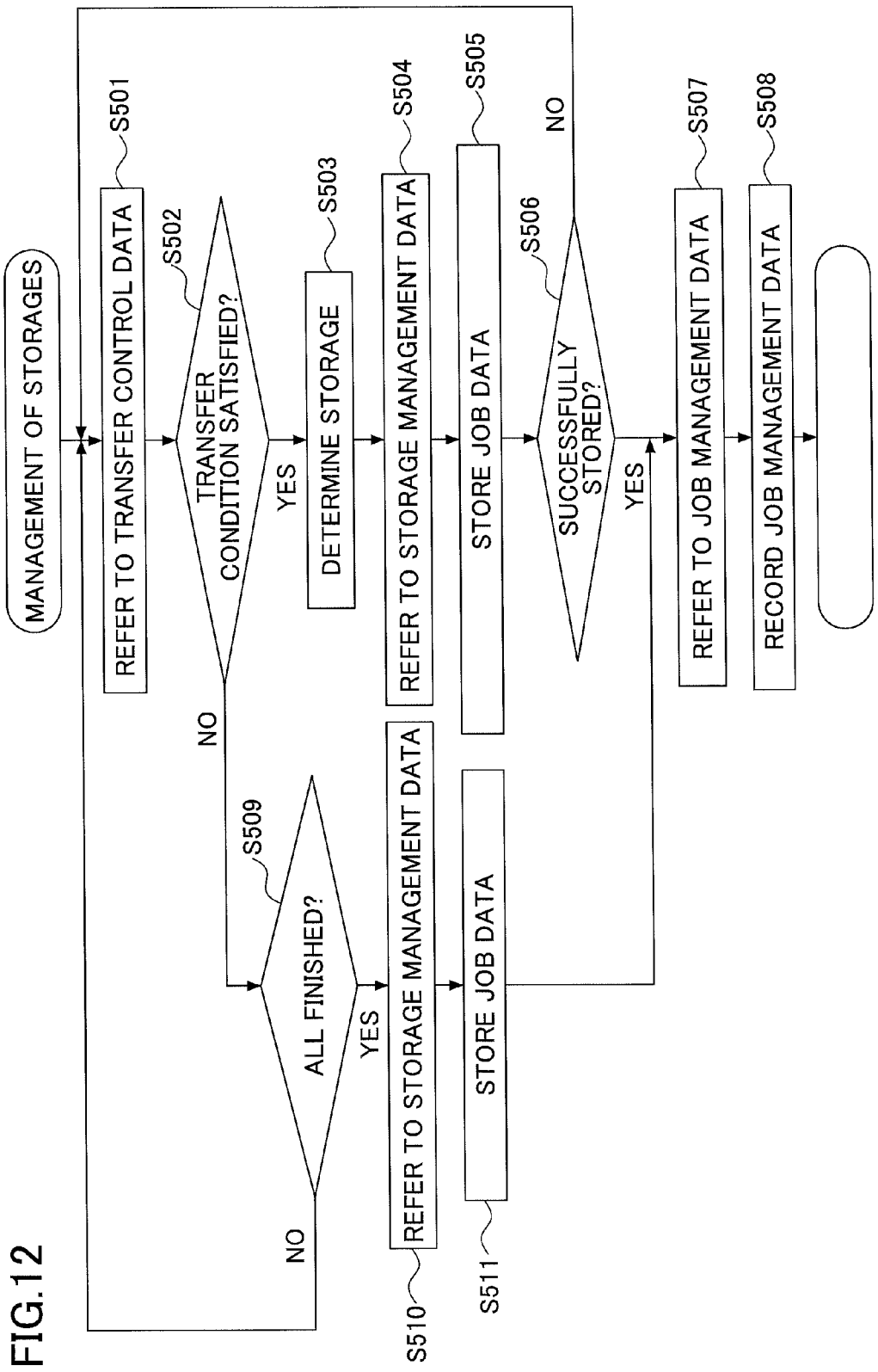
FIG. 12 a flowchart showing an example of performing management of storages when the job data is accepted of the embodiment.

FIG. 12 is a flowchart showing an example of performing the management of the storages of the embodiment when the job data is accepted. The processes corresponding to steps S405 to S410 (the operation of the storage management unit 14 in cooperation with the job management unit 12) are shown.

As shown in FIG. 12, upon receiving the indication to perform the management of the storages, the storage management unit 14 accesses the transfer control data storing unit 70, and refers to the transfer control data 70D (step S501). Specifically, the storage management unit 14 specifies the data set of the transfer control data 70D with the highest priority based on the priority data "1, 2, 3, 4 or the like".

Then, the storage management unit 14 determines whether the transfer condition of the specified data set is satisfied (step S502).

Here, it is assumed that the storage management unit 14 specifies the data set with the priority data "1" (see FIG. 6). At this time, the control parameter data of the specified data set is "Job.Count". Thus, the storage management unit 14 obtains the number of jobs having job data stored in the internal job data storing unit 80 of the job management apparatus 100 based on the control parameter data "Job.Count". Further, it is assumed that the number of jobs having job data stored in the job management apparatus 100 is "1001" and the storage management unit 14 obtains "1001" as "Job.Count". At this time, the storage management unit 14 inputs the obtained "1001" in "Job.Count" of the conditional expression of the predetermined transfer condition data "Job.Count≥1000" of the specified data set. Then, the storage management unit 14 determines whether the transfer condition is satisfied based on the input result.

When it is determined that the transfer condition is satisfied in step S502 (step S502: YES), the storage management unit 14 determines a storage in which to store the job data based on the new storage ID data "external 01" of the specified data set (step S503). The storage management unit 14 reports the control result including the storage ID data "external 01" of the determined storage to the job management unit 12.

When there are plural determined storages, the storage management unit 14 reports the control result including plural storage ID data of the determined storages in accordance with the order of priority.

Upon receiving the control result report from the storage management unit 14, the job management unit 12 accesses the management data storing unit 90 and refers to the storage management data 90D$_S$ (step S504).

The job management unit 12 stores the job data in accordance with the method of accessing of the determined storage (step S505). Specifically, the job management unit 12 specifies the corresponding data set of the storage management data 90D$_S$ based on the received storage ID data "external 01". Then, the job management unit 12 stores the job data "Job_2" which is received with the request to store in the external job data storing unit 60 of the storing apparatus 400, which is the determined storage, based on the method of accessing data "SMB, ¥¥NAS¥Storage¥ . . . " of the specified data set.

Then, the job management unit 12 determines whether the job is successfully stored (step S506). At this time, the job management unit 12 may determine whether the job data is successfully stored based on an accessing result to the storage.

When it is determined that the job is successfully stored in step S506 (step S506: YES), the job management unit 12 refers to the job management data 90D$_J$ (step S507), records the data set of the job data in the job management data 90D$_J$ (step S508), and ends the process. Specifically, the job management unit 12 accesses the management data storing unit 90 first, and generates a new data set (record) with job ID data "J0002" issued for the accepted job data. Then, the job management unit 12 records values included in the analyzed data such as storage user ID data, bibliography data, size data for the stored job data to correspond to the items such as "storage user ID", "bibliography", "size" and the like, of the new data set of the job management data 90D$_J$. Further, the job management unit 12 records the storage ID data of the stored job data "external 01" ("internal 01" in another case, for example) and access information of the stored job data ¥¥NAS¥Storage¥UserB¥Job_2" (or file: ¥D¥¥Storage¥UserB¥Job_2" in another case, for example) that correspond to the items of the "storage information".

In step S502, when it is determined that the transfer condition is not satisfied (step S502: NO), the storage management unit 14 determines whether the examinations are performed for all of the data sets (predetermined transfer conditions) of the transfer control data 70D (step S509).

When it is determined that not all of the data sets are examined (step S509: NO), the storage management unit 14 proceeds back to step S501, specifies the data set of the next highest priority, and repeats the same operation.

When it is determined that all of the data sets are examined in step S509 (step S509: YES), the storage management unit 14 outputs a control result including the storage ID data "internal 01", which indicates a default storage, to the job management unit 12.

Upon receiving the control result from the storage management unit 14, the job management unit 12 accesses the management data storing unit 90 and refers to the storage management data 90D$_S$ (step S510).

The job management unit 12 stores the job data in accordance with the method of accessing the default storage (step S511). Specifically, the job management unit 12 specifies the corresponding data set of the storage management data 90D$_S$ based on the received storage ID data "internal 01". The job management unit 12 obtains the method of accessing data "FileSystem, file:¥¥D¥Storage¥ . . . " of the specified data set (see FIG. 5). Then, the job management unit 12 stores the job data "Job_2" in the internal job data storing unit 80 of the job management apparatus 100, which is the default storage, in accordance with the obtained method of accessing. Then, the process proceeds to step S507.

Further, in step S506, when it is determined that the job is not successfully stored (step S506: NO), the job management unit 12 moves back to step S501. At this time, the job management unit 12 specifies the data set of the next highest priority, and repeats the same operation.

There is a case where the storage management unit 14 reports the control result including plural storage ID data from the job management unit 12 in step S503. At this time, even when it is determined that the job is not successfully stored in step S506 (step S506: NO), the job management unit 12 tries to store the job data in the next candidate to store. When it is determined that the job is not successfully stored in all of the candidates for the alternative storage, the job management unit 12 moves back to step S501.

As described above, according to the job management function of the embodiment, the storage in which to store the job data is managed in accordance with the predetermined transfer condition in cooperation with the storing apparatus 400 providing an external storage service (when the job data is accepted).

As described above, according to the job management system 1 of the embodiment, in the job management apparatus 100, the storage management unit 14 determines whether a job (job data) to manage satisfies the predetermined transfer condition. Then, the job management unit 12 determines the storage in which to store the job data among the candidates for the storage including the storing apparatus 400 providing an external storage service based on the determined result. Thus, the job management apparatus 100 stores the job data in the determined storage.

With this operation, according to the job management system 1 of the embodiment, an environment in which the management of the storages to store job data is performed with consideration of reducing utilization of the internal storage and convenience in service can be provided and a flexible job management service can be actualized.

Alternative Example

In this example, the job management of storages is performed using transfer control data 70D in which control timing (examining timing) can be controlled for each of the transfer conditions.

With this operation, according to the job management function of the example, an environment in which the job management is highly performed for each of the control timings can be provided.

FIG. 13 is a view showing another example of the transfer control data 70D of the embodiment.

As shown in FIG. 13, the transfer control data 70D includes one or more data sets, each including an item "control timing"

in addition to the items such as control parameter, transfer condition, new storage ID, priority and the like. One of the data sets is prepared for each of the transfer conditions.

The item "control timing" stores control timing data that indicates timing to examine and determine whether the corresponding transfer condition is satisfied. Data for the item "control timing" may be "when job data is accepted" and/or "after job data is processed" or the like.

For the transfer control data 70D shown in FIG. 13, transfer conditions such as "a predetermined word or a predetermined phrase is included?" (Job.Name includes "confidential") and "the accumulated use value (Print.Count) is more than or equal to a predetermined value?" (Print.Count≥100) are set for the control timing "when job data is accepted" (just shown as "when job accepted" in FIG. 13).

Further, transfer conditions such as in executing the job, "data size value of the executed job is more than or equal to a predetermined value?" (Job.Size≥10 MB), "the accumulated use value is more than or equal to a predetermined value?" (Print.Count≥100) are set for the control timing "after job data is processed" (just shown as "after job processed" in FIG. 13).

Here, the transfer condition "the accumulated use value is more than or equal to a predetermined value?" (Print.Count≥100) is set to be examined both when the job data is accepted and after the job data is processed. This is because the control parameter (variable) of this transfer condition changes when the job data is accepted and after the job data is processed.

The data for the above items may be determined as follows. First, an administrator or the like determines transfer conditions for the storage and control timings in accordance with a content of a service or an operating policy of the service to be provided to users with consideration of reducing utilization of the internal storage and convenience in service. Then, the data for the above items are determined based on the determined transfer conditions and the control timings.

In the job management apparatus 100, the operation shown in FIG. 11 is performed when job data is accepted. Specifically, the storage management unit 14 determines whether a transfer condition to be examined when the job is accepted is set in the transfer control data 70D based on the control timing data. When it is determined that the transfer condition exists, the storage management unit 14 determines whether the transfer condition is satisfied in accordance with the priority as shown in FIG. 12.

Further, in the job management apparatus 100, the operation shown in FIG. 8 is executed after the job data is processed. Specifically, the storage management unit 14 determines whether a transfer condition to be examined when the job data is processed is set in the transfer control data 70D based on the control timing data. When it is determined that the transfer condition exists, the storage management unit 14 determines whether the transfer condition is satisfied in accordance with the priority as shown in FIG. 9.

As described above, according to the job management function of the example, the management of the storages to store job data is performed in accordance with the predetermined transfer condition set for the control timing when the job data is accepted and/or after the job data is processed in cooperation with the storing apparatus 400.

Second Embodiment

In this embodiment, a technique of performing the management of the storages to store job data in cooperation with a user management apparatus that provides a user management service in accordance with the predetermined transfer condition is provided.

With this operation, according to the job management function of the embodiment, an environment in which job management with a convenience is performable can be provided and a flexible job management service can be actualized.

It is to be noted that, in the explanation of the drawings, the same components are given the same reference numerals, and explanations are not repeated.

(System Structure)

Figure 14:
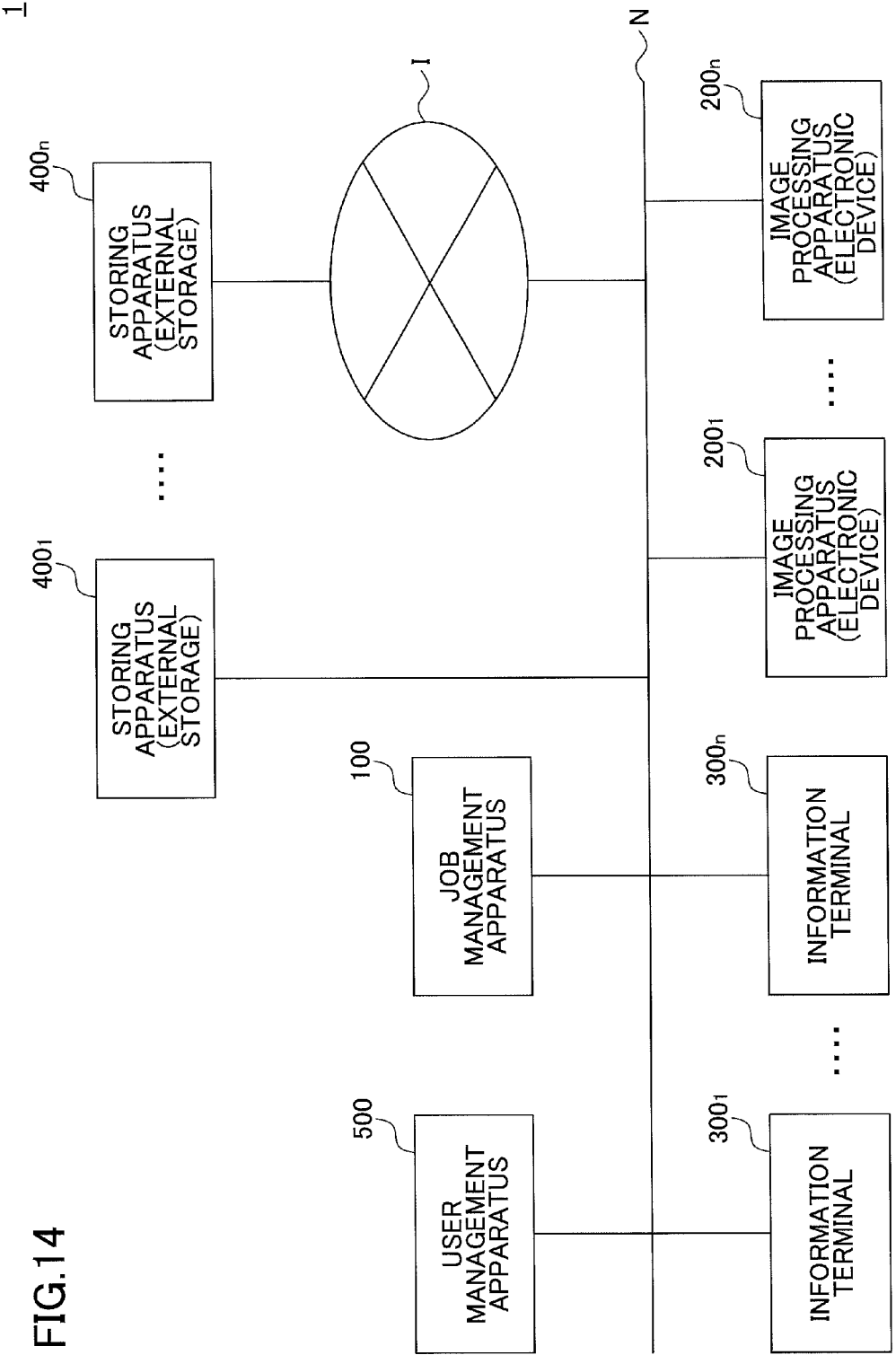
FIG. 14 is a block diagram showing an example of a job management system of another embodiment.

FIG. 14 is a block diagram showing an example of the job management system 1 of the embodiment.

As shown in FIG. 14, the job management system 1 further includes a user management apparatus 500 that manages users in addition to the job management apparatus 100, the image processing apparatus 200, the information terminal 300, and the storing apparatus 400 shown in FIG. 1. The user management apparatus 500 is also connected to the network N. The user management apparatus 500 is a data processing apparatus having a user management function including user authentication.

(Job Management Function)

Figure 15:
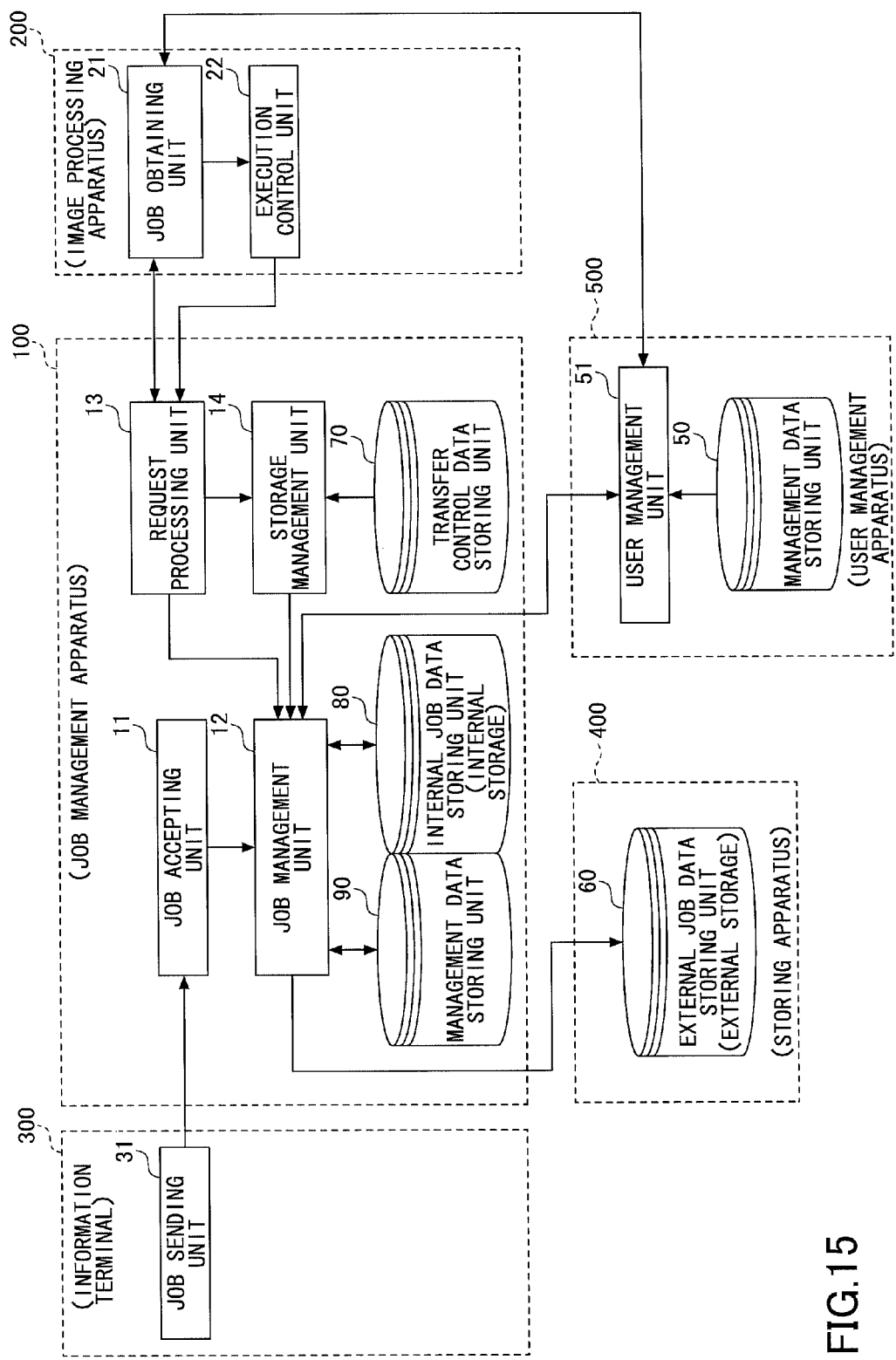
FIG. 15 is a block diagram showing an example of the functional components to perform a job management function of the embodiment.

FIG. 15 is a block diagram showing an example of the functional components for performing the job management function of the embodiment. The job management system 1 of the embodiment further includes functional components of the user management apparatus 500 in addition to the components shown in FIG. 3.

The user management apparatus 500 includes a user management unit 51 as the job management function of the embodiment. The user management apparatus 500 further includes a management data storing unit 50.

The job management function of the embodiment is actualized by a combination of the components.

The user management unit 51 manages users who use the service of the embodiment by a predetermined data operation. The user management unit 51 accesses the management data storing unit 50, and manages the users based on the user management data stored in the user management unit 51. The management data storing unit 50 corresponds to a predetermined storing area of a storage device of the user management apparatus 500.

The user management data is explained.

FIG. 16 is a view showing an example of user management data 50D of the embodiment.

As shown in FIG. 16, the user management data 50D includes one or more data sets, each including items such as user ID, log-in authentication, accessible storage ID, access authentication and the like. One of the data sets is prepared for each user.

The item "user ID" stores user ID data that identifies a user. The item "log-in authentication" stores log-in authentication data of the user. Data for the item "log-in authentication" may be a log-in authentication value (password) allocated to the user or the like. The item "accessible storage ID" stores accessible storage ID data that identifies the storage which the user is permitted to access (store data). Data for the item "accessible storage ID" may be a storage identifier (storage ID) allocated to an internal/external storage for which the user has previously conducted a procedure for access permission (user registration) and the like. The item "access authentication" stores access authentication data in the storage. Data for the item "access authentication" may be user identifier (user ID), the access authentication value (password) or the like of the user obtained when the user conducted the procedure for access permission.

The data for the above items of the user management data 50D may be previously determined by an administrator/user and the like.

Referring back to FIG. 15, the user management unit 51 accepts a request for a user authentication upon receiving user ID data of a log-in user and log-in authentication data which are input when the user is logging in from the job obtaining unit 21 of the image processing apparatus 200, and performs the user authentication based on the log-in authentication data of the user management data 50D.

Specifically, the user management unit 51 accesses the management data storing unit 50, and specifies the corresponding data set of the user management data 50D based on the received user ID data. Then, the user management unit 51 performs the user authentication based on a determined result whether the log-in authentication data of the specified data set matches the received log-in authentication data. At this time, the user management unit 51 determines that the user authentication has succeeded when the log-in authentication data of the specified data set matches the received log-in authentication data. The user management unit 51 reports authentication result (success/failure) to the job obtaining unit 21 of the image processing apparatus 200 in response.

With this operation, based on the received authentication result, the job obtaining unit 21 of the image processing apparatus 200 controls displaying of operations panels for obtaining the job list of the user or selecting job data to be executed.

Further, when the job data is determined to be stored in the external storage, and when the external storage providing service requires the access authentication, the following operation is performed.

The user management unit 51 accepts a request for confirming access permission upon receiving user ID data of the user, who is a job owner, and storage ID data of the storage which is determined to store the job data from the job management unit 12 of the job management apparatus 100. The user management unit 51 confirms access permission to the determined storage of the user based on the accessible storage ID data of the user management data 50D.

Specifically, the user management unit 51 accesses the management data storing unit 50, and specifies the corresponding data set of the user management data 50D based on the received user ID data. The user management unit 51 confirms the access permission based on a determined result whether an identifier that matches the received storage ID data exists in the accessible storage ID data of the specified data set. At this time, the user management unit 51 determines that the access permission to the determined storage is confirmed when an identifier that matches the received storage ID data exists in the accessible storage ID data of the specified data set.

The user management unit 51 sends the confirmed result (access permitted/access not permitted) to the job management unit 12 of the management apparatus 100 in response. At this time, the user management unit 51 sends the confirmed result including access authentication data corresponding to the accessible storage ID data for which the identifier that matches the received storage ID data is set.

With this operation, the job management unit 12 of the management apparatus 100 stores the job data in the storage determined by the management of the storages based on the received confirmed result. Upon obtaining the confirmed result including the access authentication data, the job management unit 12 accesses the management data storing unit 90, and specifies the corresponding data set of the storage management data $90D_S$ based on the storage ID data of the determined storage. The job management unit 12 accesses the external job data storing unit 60/the internal job data storing unit 80 based on the method of accessing data (storage format of data/transmission method data) and the received access authentication data.

As described above, the job management function of the embodiment is actualized by a combination of the components.

The operation of the job management function of the embodiment is explained in detail with reference to a sequence diagram and a flowchart.

(Operation)

Figure 17:
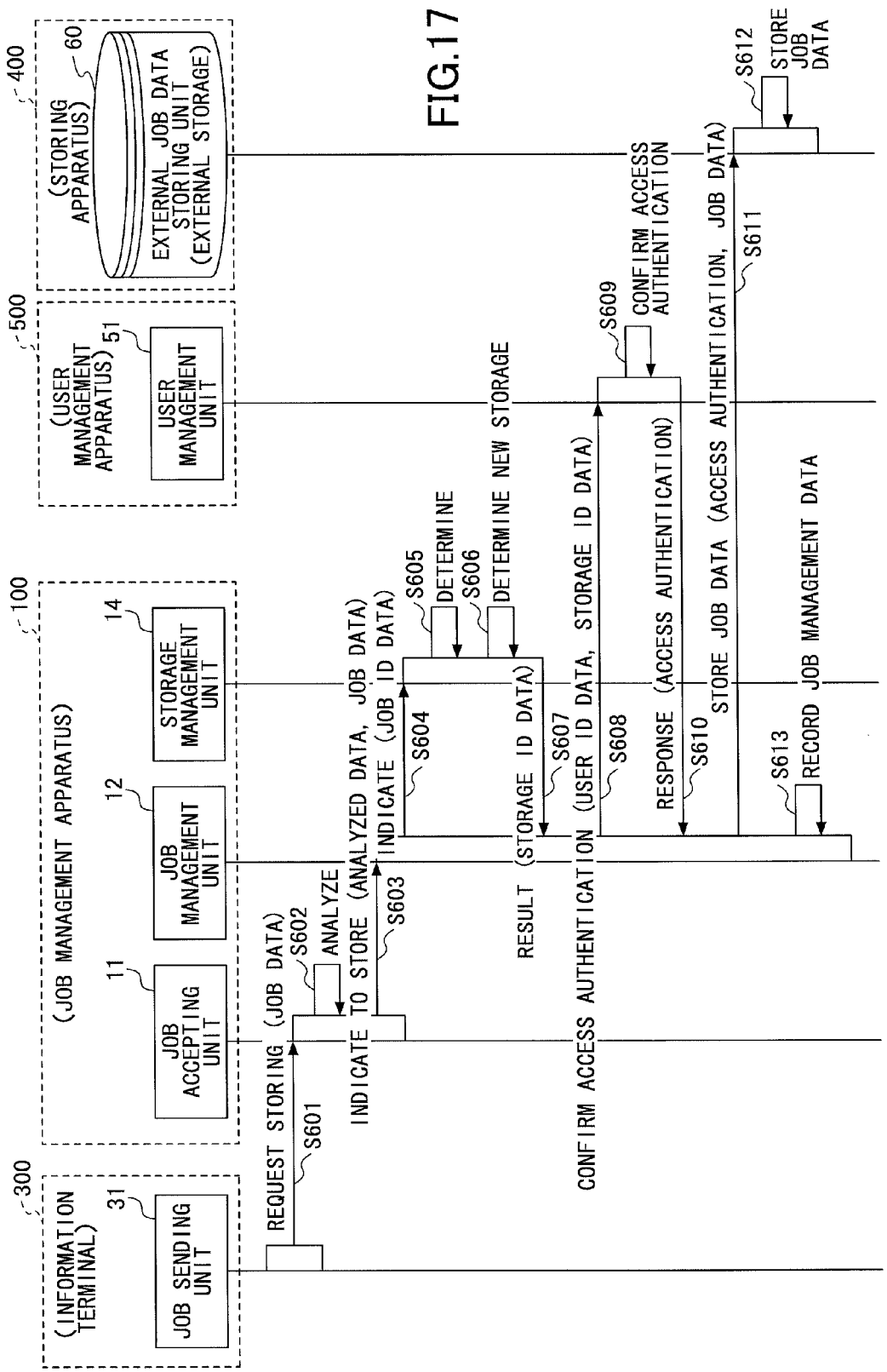
FIG. 17 is a sequence diagram showing an example of a job management function of the embodiment when the job is accepted.

FIG. 17 is a sequence diagram showing an example of the job management function of the embodiment when job data is accepted. In the following, an example is explained where the job data "Job_2" of the user "UserB" is determined to be stored in the external job data storing unit 60 of the storing apparatus 400 which is identified by "external 01".

As shown in FIG. 17, in the information terminal 300, the job sending unit 31 requests storing a job by sending job data to the job accepting unit 11 of the job management apparatus 100 (step S601).

In the job management apparatus 100, upon accepting the request to store the job data, the job accepting unit 11 analyzes the accepted job data (step S602). The job accepting unit 11 obtains data such as the storage user ID "UserB", the bibliography of job "(file name: Memo.txt, . . . , the number of printings: 1, color setting: monochrome, . . . )", size of the job data "128" and the like as an analyzed result of the job data.

The job accepting unit 11 outputs the obtained data from the analyzed result (the analyzed data) and the job data to the job management unit 12 and indicates to the job management unit 12 to store the job data (step S603).

Upon receiving the indication to store the job data, the job management unit 12 outputs the job ID data "J002" to the storage management unit 14 and indicates to the storage management unit 14 to perform the management of the storages (step S604).

Upon receiving the indication to perform the management of the storages, the storage management unit 14 determines whether a predetermined transfer condition is satisfied for the job data to be stored (accepted job data) (step S605).

Then, the storage management unit 14 determines the storage in which to store the job data (the storage identified by "external 01" for example) from the candidates for the alternative storage based on the determined result (step S606).

Thereafter, when the storage management unit 14 determines the storage in which to store the job data, the storage management unit 14 reports a control result including the storage ID data "external 01" of the determined storage to the job management unit 12 (step S607).

Upon receiving the control result report, the job management unit 12 sends the user ID data "UserB" of the storage user received from the job accepting unit 11 as the analyzed result and the storage ID data "external 01" received from the storage management unit 14 to the user management unit 51 of the user management apparatus 500, and indicates to the user management unit 51 to confirm an access permission of the user to the determined storage (step S608).

In the user management apparatus 500, upon receiving the request to confirm the access permission, the user management unit 51 confirms the access permission to the determined storage based on the received user ID data "UserB" and the storage ID data "external 01" (step S609). The user management unit 51 sends the confirmed result including the access authentication data "UserB,YYY1" and the like to the job management unit 12 of the job management apparatus 100 in response (step S610).

Specifically, the user management unit 51 accesses the management data storing unit 50, and specifies the corresponding data set of the user management data 50D based on the received user ID data "UserB". Then, the user management unit 51 confirms the access permission based on a determined result whether an identifier that matches the received storage ID data "external 01" exists in the accessible storage ID data "external 01, external 02" of the specified data set (see FIG. 16). When the identifier that matches the received storage ID data "external 01" exists, the user management unit 51 determines that the access permission to the determined storage is confirmed. The user management unit 51 sends the confirmed result including the access authentication data "UserB,YYY1" corresponding to the accessible storage ID data "external 01" for which the matched identifier is set to the job management unit 12 of the job management apparatus 100 in response.

In the job management apparatus 100, upon receiving the confirmed result of the access permission, the job management unit 12 accesses the external job data storing unit 60 which is identified by "external 01" in accordance with the method of accessing which is specified based on the storage ID data "external 01" with the control result. The job management unit 12 stores the accepted job data "Job_2" in the external job data storing unit 60 (step S611).

Specifically, the job management unit 12 accesses the management data storing unit 90 and specifies the corresponding data set of the storage management data $90D_S$ based on the storage ID data "external 01" of the determined storage. The job management unit 12 accesses the external job data storing unit 60 identified by "external 01" based on the method of accessing data "SMB, ¥¥NAS¥Storage¥..." of the specified data set and the access authentication based on the received access authentication data "UserB,YYY1". The job management unit 12 stores the job data "Job_2". With this operation, the job data that satisfies the transfer condition is stored in the storing apparatus 400 providing an external storage service (step S612).

In the job management apparatus 100, when the job management unit 12 succeeds in storing the job data, the job management unit 12 records a data set of the job management data $90D_J$ for the stored job data (step S613). With this operation, when the predetermined transfer condition is satisfied, the job data is stored in the storing apparatus 400 (the storage identified by "external 01").

As described above, according to the job management function of the embodiment, the storage in which to store the job data is managed in accordance with the predetermined transfer condition in cooperation with the storing apparatus 400 providing an external storage service.

Although in the above explanation of the embodiment, it is described that the management of the storages to store is performed when the job data is accepted, it is not limited so. For example, the management of the storages in which to store may be similarly performed after the job data is processed. Specifically, the operation of steps S608 to S610 may be performed between the operation of step S212 and step S213 shown in FIG. 8.

As described above, according to the job management system 1 of the embodiment, in the job management apparatus 100, the storage management unit 14 determines whether the predetermined transfer condition is satisfied for the job data to be stored in the internal job data storing unit 80. The job management unit 12 determines the storage in which to store the job data from the candidates for the alternative storage based on the determined result.

Then, the job management unit 12 confirms the access permission to the determined storage to the user management unit 51 of the user management apparatus 500. As a result, upon receiving the confirmed result report of the access permission from the user management apparatus 500, the job management apparatus 100 stores the job data in the determined storage.

With this operation, according to the job management system 1 of the embodiment, the same merits as those of the first embodiment can be obtained as well as the environment in which job management with a convenience is performable. Specifically, even when the external storage providing service requires the access authentication, the job management service can be provided in cooperation with such an external storage without troublesome authentication operation.

Alternative Example

In this example, the job management of storages is performed using transfer control data 70D in which an applicable user to whom the transfer condition is applied can be controlled for each of the transfer conditions.

With this operation, according to the job management function of the example, an environment in which the job management is proficiently performed for each of the users can be provided.

FIG. 18 is a view showing another example of the user management data 50D of the embodiment.

As shown in FIG. 18, the user management data 50D includes one or more data sets, each including an item "use history" in addition to the items such as user ID, log-in authentication, accessible storage ID, access authentication and the like. One of the data sets is prepared for each of the users.

The item "use history" stores use history data that indicates accumulated use value of the device or function. Data for the item "use history" may be the number of copied or printed color/monochrome documents or the like.

The data for the items may be recorded or updated as follows. The request processing unit 13 of the job management apparatus 100 obtains a use value after the job data is processed based on an executed result of the job data reported from the execution control unit 22 of the image processing apparatus 200. The request processing unit 13 of the job management apparatus 100 requests the user management unit 51 of the user management apparatus 500 to record and update the data of the "use history" of the user management data 50D by sending the obtained use value. The use history data (accumulated use value) may be used as one of the control parameters of the transfer control data 70D when performing the management of the storages to store.

FIG. 19 is a view showing an example of the transfer control data 70D of the embodiment.

As shown in FIG. 19, the transfer control data 70D includes one of more data sets, each including an item "applied user ID" in addition to the items such as control parameter, transfer condition, new storage ID, priority or the like. Each of the data sets is prepared for each transfer condition.

The item "applied user ID" stores applied user ID data indicating a user to whom to apply the transfer condition.

In the transfer control data 70D shown in FIG. 19, it is set that the transfer condition "a predetermined word or a predetermined phrase is included in the job?" is applied to the users "UserA" and "UserB". Further, it is set that the transfer condition "data size value of the executed job is more than or equal to a predetermined value?" (Job.Size≥10 MB) is applied to the users "UserA" and "UserC". Further, it is set that the transfer condition "the accumulated use value after the job data is processed is more than or equal to a predetermined value?" (User.Print.Count≥100) is applied to the user "UserB".

The data for the above items of the transfer control data 70D may be previously determined by an administrator or the like. Specifically, the transfer conditions and the applicable users are determined in accordance with a content of a service or an operating policy of the service to be provided to users and then data for the above items of the transfer control data 70D are predefined based on the determined transfer conditions and the applicable users.

In the job management apparatus 100, the operation shown in FIG. 20 is performed when the job is accepted (when the request to store the job data is accepted).

(Operation)

FIG. 20 is a sequence diagram showing an example of the job management function of the embodiment when the job data is accepted. In the following, only the points different from those shown in FIG. 17 are explained.

As shown in FIG. 20, in the job management apparatus 100, upon receiving the indication to store job data, the job management unit 12 outputs the user ID data "UserB" of the storage user received from the job accepting unit 11 as the analyzed result and the job ID data "J002" issued by the job accepting unit 11 to the storage management unit 14 and indicates to the storage management unit 14 to perform the management of the storages (step S704).

Upon receiving the indication to perform the management of the storages, the storage management unit 14 sends the received user ID data "UserB" to the user management unit 51 of the user management apparatus 500, and requests sending of the user management data 50D corresponding to the user (step S705).

In the user management apparatus 500, upon receiving the data sending request, the user management unit 51 obtains the use history data "101", the accessible storage ID data "external 01, external 02", and the access authentication data "UserB,YYY1", "UserB,YYY2" of the user based on the received user ID data "UserB" (step S706). The user management unit 51 sends the obtained data to the storage management unit 14 of the job management apparatus 100 in response (step S707).

Specifically, the user management unit 51 accesses the management data storing unit 50, and specifies the corresponding data set of the user management data 50D based on the received user ID data "UserB". Then, the user management unit 51 obtains the use history data "101", the accessible storage ID data "external 01, external 02", and the access authentication data "UserB,YYY1", "UserB,YYY2" of the specified data set. Then, the user management unit 51 sends the obtained data "101", "external 01", "external 02", "UserB,YYY1", and "UserB,YYY2" to the storage management unit 14 of the job management apparatus 100 in response.

In the job management apparatus 100, upon receiving the obtained data, the storage management unit 14 determines whether the transfer condition set for the user "UserB" is satisfied for the corresponding job data (step S708). The storage management unit 14 determines the storage in which to store the job data, the storage identified by "external 01", from the candidates for the alternative storage based on the determined result (step S709).

Specifically, the storage management unit 14 accesses the transfer control data storing unit 70, refers to the transfer control data 70D based on the received user ID data "UserB", and specifies the data set to be applied to the user "UserB". The storage management unit 14 determines whether the transfer condition specified based on the user "UserB" is satisfied. When the specified transfer condition data "User. Print.Count≥100" is specified, the control parameter data of the specified data set is "User.Print.Count". Thus, the storage management unit 14 of the data set inputs the received use history data "101" into the specified conditional expression (User.Print.Count: 101≥100).

Then, the storage management unit 14 determines whether the transfer condition is satisfied based on the input result to the conditional expression. When it is determined that the transfer condition is satisfied, the storage management unit 14 determines a new storage to store the current job data based on the new storage ID data "external 02" of the specified data set. The storage management unit 14 reports the control result including storage ID data "external 02" of the determined storage to the job management unit 12.

Then, after determining the storage, the storage management unit 14 sends the control result including the storage ID data "external 02" of the determined storage and the access authentication data "UserB,YYY2" (the access authentication data corresponding to the determined storage) to the job management unit 12 (step S710).

Upon receiving the control result report of the storage, the job management unit 12 accesses the external job data storing unit 60 which is identified by "external 02" in accordance with the method of accessing specified based on the received storage ID data "external 02". The job management unit 12 stores the job data "Job_2" which is received with the request to store the job data (step S711).

Specifically, the job management unit 12 accesses the management data storing unit 90, and specifies the corresponding data set of the storage management data 90D$_S$ based on the storage ID data "external 02" of the determined storage. The job management unit 12 accesses the external job data storing unit 60 identified by the "external 02" based on the method of accessing data "HTTP, http://aaa.com/ . . . " and the access authentication based on the access authentication data "UserB,YYY2" received with the control result report of the specified data set. The job management unit 12 stores the job data "Job_2". With this operation, the job data is stored in the storing apparatus 400 providing an external storage service when the transfer condition is satisfied (step S712).

As described above, according to the job management function of the example, storage to store job data is controlled in accordance with the transfer condition defined for each of the users in cooperation with the user management apparatus 500 that provides a user management service.

Further, in the above explanation of the embodiment, the cooperative operation by the job management apparatus 100 and the user management apparatus 500 when the job data is accepted is explained; however, the embodiments discussed herein are not limited so. For example, the cooperative operation by the job management apparatus 100 and the user management apparatus 500 may be similarly performed after the job data is processed. Specifically, the operation of steps S705 to S707 may be performed between the operation of step S209 and step S210 shown in FIG. 8.

The "job management function" of the above embodiments can be actualized by executing the programs in which the above processes explained with reference to drawings are coded in programming languages in accordance with the respective operating environments (platforms) by the arithmetic/logic units (CPU) of the apparatuses (the job management apparatuses 100, the image processing apparatuses 200, the information terminals 300, the user management apparatus 500 and the like) of the job management system 1.

The above programs may be stored in the computer readable recording medium 103a. With this, for example, for the job management apparatus 100, the above programs may be installed in the job management apparatus 100 via the external I/F 103. Further, as the job management apparatus 100 includes the communication I/F 107, the above programs may be downloaded using an electrical communication line and installed.

Further, in the above embodiment, the transfer condition is exemplified as "the number of jobs having job data stored in the internal job data storing unit 80 is more than or equal to a predetermined number?", "the data size value of the job data is more than or equal to a predetermined value?", "a predetermined word (or a predetermined phrase) is included in the job data?", "the accumulated use value by the execution by the job data is more than or equal to a predetermined value ?" or the like. However, the transfer condition is not limited so. The transfer condition may be determined based on information related to a job such as "the storage period for the job is more than or equal to a predetermined time?", "the executed times of the job is more than or equal to a predetermined value?", "the number of pages of the job is more than or equal to a predetermined value?" or the like. Further, the transfer condition may be determined based on information related to storage such as "the remaining capacity of the storage is less than or equal to a predetermined value?", "is the storage capable of being used" or the like.

Further, although in the above embodiments, the job management apparatus 100, the image processing apparatus 200 and the user management apparatus 500 are explained to be connected with each other via the network N. However, the functions of these apparatus may be included in a single apparatus. For example, the image processing apparatus 200 may be configured to include the functions of the job management apparatus 100 and/or the functions of the user management apparatus 500. Further, the internal job data storing unit 80 may be configured to be included in the image processing apparatus 200. Further, the job management apparatus 100 may be configured to include the functions of the user management apparatus 500.

According to the embodiments, a job management apparatus, a method of managing jobs, and a recording medium storing the method capable of flexibly controlling storing of job data can be provided.

The individual constituents of the job management system 1 may be realized by arbitrary combinations of hardware and software, typified by a CPU of an arbitrary computer, memory, a program loaded in the memory so as to embody the constituents illustrated in the drawings, storage units for storing the program such as a hard disk, and an interface for network connection. It may be understood by those skilled in the art that methods and devices for the embodiment allow various modifications.

Although a preferred embodiment of the job management system has been specifically illustrated and described, it is to be understood that minor modifications may be made therein without departing from the sprit and scope of the invention as defined by the claims.

The present invention is not limited to the specifically disclosed embodiments, and variations and modifications may be made without departing from the scope of the present invention.

The present application is based on Japanese Priority Application No. 2011-238580 filed on Oct. 31, 2011, the entire contents of which are hereby incorporated by reference.

What is claimed is:

1. A job management apparatus, comprising:
a processor;
a memory storing instructions that, when executed, cause the processor to function as;
a job accepting unit configured to accept job data of a job to be executed by an electronic device from an external information terminal,
a job management unit configured to store the accepted job data in a first storage apparatus when the job accepting unit accepts the job data,
a management data storing unit configured to store management data which manages a storage location of the stored job data,
a job request receiving unit configured to receive a request to send the stored job data, from the electronic device,
a job data acquiring unit configured to acquire the requested job data based on the management data,
a job data sending unit configured to send the acquired job data to the electronic device,
an execution result receiving unit configured to receive an execution result of the sent job data, from the electronic device,
the job management unit being configured to store the executed job data in a second storage apparatus and delete the executed job data from the first storage apparatus, the executed job data being the job data which is determined as being executed by the electronic device based on the execution result,
a transfer condition storing unit configured to store one or more data sets of transfer condition data, each data set indicating a transfer condition to determine that the storage location of the executed job data is changed from the first storage apparatus to the second storage apparatus, and
a storage management unit configured to determine whether the transfer condition of the data set is satisfied or not, based on the transfer condition data stored in the transfer condition storing unit,
wherein the job management unit is configured to store and delete the executed job data based on a determination by the storage management unit,
wherein each of the data sets of transfer condition data includes information about control timing that indicates a timing to examine whether the transfer condition of the data set is satisfied, the timing being selected from among a job accepted timing and a job executed timing, and
wherein the storage management unit determines whether the transfer condition of the data set is satisfied at the timing indicated by the information about control timing.

2. The job management apparatus according to claim 1, wherein each of the data sets of transfer condition data includes priority data, and
wherein the storage management unit determines whether the transfer condition of the data set is satisfied in order based on the priority data.

3. The job management apparatus according to claim 1, wherein the first storage apparatus is included in the job management apparatus, and the second storage apparatus is connected to the job management apparatus via a network and not included in the job management apparatus.

4. The job management apparatus according to claim 1,
wherein each of the data sets of transfer condition data includes information about an applicable user that indicates a user to whom the transfer condition is to be applied, and
wherein the storage management unit determines whether the transfer condition of the data set is satisfied for the user identified by the information about the applicable user.

5. The job management apparatus according to claim 1,
wherein the job management unit stores the job data in the second storage apparatus in accordance with a predetermined method of accessing that is set for the second storage apparatus.

6. The job management apparatus according to claim 1,
wherein the instructions stored in the memory, when executed, further cause the processor to function as
a user management unit configured to confirm an access permission to access the first storage apparatus or the second storage apparatus by a user based on a user ID and a storage ID, and
wherein the job management unit
accepts the user ID of the user of the job data,
sends a request to confirm the access permission to access the first storage apparatus or the second storage apparatus by the user when the job data is determined to be stored in the first storage apparatus or in the second storage apparatus with the accepted user ID and the storage ID of the first storage apparatus or the second storage apparatus to the user management unit, respectively, and
stores the job data in the first storage apparatus or in the second storage apparatus when it is confirmed that the user is permitted to access the first storage apparatus or in the second storage apparatus by the user management unit, respectively.

7. The job management apparatus according to claim 6,
wherein the user management unit is configured to send a confirmed result including an access authentication to access the first storage apparatus or the second storage apparatus when it is confirmed that the user is permitted to access the first storage apparatus or the second storage apparatus to the job management unit, respectively, and
the job management unit accesses the first storage apparatus or the second storage apparatus based on the access authentication sent from the user management unit and stores the job data in the first storage apparatus or in the second storage apparatus, respectively.

8. A method of managing jobs by a job management apparatus, comprising:
a job accepting step of accepting job data of a job to be executed by an electronic device from an external information terminal;
a first job management step of storing the accepted job data accepted in the job accepting step in a first storage apparatus;
a job request receiving step of receiving a request to send the stored job data, from the electronic device;
a job data acquiring step of acquiring the requested job data based on management data which manages a storage location of the stored job data stored in a management data storing unit;
a job data sending step of sending the acquired job data to the electronic device;
an execution result receiving step of receiving an execution result of the sent job data, from the electronic device;
a second job management step of storing the executed job data in a second storage apparatus and deleting the executed job data from the first storage apparatus, the executed job data being the job data which is determined as being executed by the electronic device based on the execution result; and
a storage management step of determining, based on one or more data sets of transfer condition data stored in a transfer condition storing unit, each data set indicating a transfer condition to determine that the storage location of the executed job data is changed from the first storage apparatus to the second storage apparatus, whether the transfer condition of the data set is satisfied or not,
wherein in the second job management step, storing and deleting the executed job data are performed based on a determination in the storage management step,
wherein each of the data sets of transfer condition data includes information about control timing that indicates a timing to examine whether the transfer condition of the data set is satisfied, the timing being selected from among a job accepted timing and a job executed timing, and
wherein in the second storage management step, whether the transfer condition of the data set is satisfied is determined at the timing indicated by the information about control timing.

9. A non-transitory computer-readable recording medium having recorded thereon a program that causes a computer to execute a method of managing jobs comprising:
a job accepting step of accepting job data of a job to be executed by an electronic device from an external information terminal;
a first job management step of storing the accepted job data accepted in the job accepting step in a first storage apparatus;
a job request receiving step of receiving a request to send the stored job data, from the electronic device;
a job data acquiring step of acquiring the requested job data based on management data which manages a storage location of the stored job data stored in a management data storing unit;
a job data sending step of sending the acquired job data to the electronic device;
an execution result receiving step of receiving an execution result of the sent job data, from the electronic device;
a second job management step of storing the executed job data in a second storage apparatus and deleting the executed job data from the first storage apparatus, the executed job data being the job data which is determined as being executed by the electronic device based on the execution result; and
a storage management step of determining, based on one or more data sets of transfer condition data stored in a transfer condition storing unit, each data set indicating a transfer condition to determine that the storage location of the executed job data is changed from the first storage apparatus to the second storage apparatus, whether the transfer condition of the data set is satisfied or not,
wherein in the second job management step, storing and deleting the executed job data are performed based on a determination in the storage management step,
wherein each of the data sets of transfer condition data includes information about control timing that indicates a timing to examine whether the transfer condition of the data set is satisfied, the timing being selected from among a job accepted timing and a job executed timing, and wherein in the second storage management step, whether the transfer condition of the data set is satisfied is determined at the timing indicated by the information about control timing.

10. The method of managing the jobs according to claim 8, wherein each of the data sets of transfer condition data includes priority data, and wherein in the second storage management step, whether the transfer condition of the data set is satisfied is determined in order based on the priority data.

11. The method of managing the jobs according to claim 8, wherein the first storage apparatus is included in the job management apparatus, and the second storage apparatus is connected to the job management apparatus via a network and not included in the job management apparatus.

12. The method of managing the jobs according to claim 8, wherein each of the data sets of transfer condition data includes information about an applicable user that indicates a user to whom the transfer condition is to be applied, and wherein in the storage management step, whether the transfer condition of the data set is satisfied is determined for the user identified by the information about the applicable user.

13. The method of managing the jobs according to claim 8, wherein in the second job management step, the job data is stored in the second storage apparatus in accordance with a predetermined method of accessing that is set for the second storage apparatus.

14. The method of managing the jobs according to claim 8, wherein the first job management step or the second job management step respectively includes accepting a user ID of a user of the job data, sending a request to confirm the access permission to access the first storage apparatus or the second storage apparatus by the user when the job data is determined to be stored in the first storage apparatus or in the second storage apparatus with the accepted user ID and the storage ID of the first storage apparatus or the second storage apparatus, confirming an access permission to access the first storage apparatus or the second storage apparatus by the user based on the user ID and the storage ID, and storing the job data in the first storage apparatus or in the second storage apparatus when it is confirmed that the user is permitted to access the first storage apparatus or in the second storage apparatus in the confirming.

15. The method of managing the jobs according to claim 14, wherein in the confirming, a confirmed result including an access authentication to access the first storage apparatus or the second storage apparatus is sent when it is confirmed that the user is permitted to access the first storage apparatus or the second storage apparatus to the job management unit, respectively, and wherein in the storing, the first storage apparatus or the second storage apparatus is accessed based on the access authentication sent in the confirming and the job data is stored in the first storage apparatus or in the second storage apparatus, respectively.

\* \* \* \* \*